United States Patent
Michielin et al.

(10) Patent No.: US 11,341,723 B2
(45) Date of Patent: May 24, 2022

(54) METHODS, DEVICES, AND COMPUTER PROGRAM PRODUCTS FOR IMPROVED MESH GENERATION IN CONSTRUCTED 3D IMAGES

(71) Applicant: SONY GROUP CORPORATION, Tokyo (JP)

(72) Inventors: Francesco Michielin, Stuttgart (DE); Pal Szasz, Lund (SE); Fredrik Mattisson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/967,625

(22) PCT Filed: Feb. 23, 2018

(86) PCT No.: PCT/US2018/019377
§ 371 (c)(1),
(2) Date: Aug. 5, 2020

(87) PCT Pub. No.: WO2019/164501
PCT Pub. Date: Aug. 29, 2019

(65) Prior Publication Data
US 2021/0272359 A1    Sep. 2, 2021

(51) Int. Cl.
*G06T 17/20* (2006.01)
*G06T 7/50* (2017.01)
*G06T 7/66* (2017.01)
*G06T 7/70* (2017.01)

(52) U.S. Cl.
CPC .............. *G06T 17/20* (2013.01); *G06T 7/50* (2017.01); *G06T 7/66* (2017.01); *G06T 7/70* (2017.01); *G06T 2207/10028* (2013.01); *G06T 2210/56* (2013.01)

(58) Field of Classification Search
None
See application file for complete search history.

(56) References Cited

U.S. PATENT DOCUMENTS

| 2010/0085353 | A1  | 4/2010 | Zhou et al. |
| 2013/0150994 | A1* | 6/2013 | Barbir ................ G05B 19/4099 700/98 |
| 2014/0172377 | A1  | 6/2014 | Taubin et al. |

(Continued)

OTHER PUBLICATIONS

PCT Notification Concerning Transmittal of International Preliminary Report on Patentability dated Sep. 3, 2020 for corresponding PCT International Application No. PCT/US2018/019377.

(Continued)

*Primary Examiner* — Frank S Chen
(74) *Attorney, Agent, or Firm* — Myers Bigel, P.A.

(57) ABSTRACT

Methods, systems, and computer program products for improving the generation of a 3D representation of an object may include adding a distribution of additional points to plurality of points representative of captured portions of the object based on a computational analysis of the plurality of points, and performing a surface reconstruction on the plurality of points and the distribution of additional points to generate a three-dimensional mesh representation of the object that is watertight.

18 Claims, 19 Drawing Sheets

(56) References Cited

U.S. PATENT DOCUMENTS

2015/0154795 A1    6/2015  Ogale

OTHER PUBLICATIONS

International Search Report and Written Opinion of the International Searching Authority, International Application No. PCT/US2018/019377, May 22, 2018, 11 pp.

Berger et al., "State of the Art in Surface Reconstruction from Point Clouds", in Eurographics 2014—State of the Art Reports (ed. Lefebvre et al.). The Eurographics Association, Apr. 2014, pp. 161-185.

Kazhdan et al., "Poisson Surface Reconstructions", Proceedings of the Fourth Eurographics Symposium on Geometry Processing, Cagliari, Sardinia, IT, Jun. 26-28, 2006, pp. 61-70.

\* cited by examiner

400d

400d

METHODS, DEVICES, AND COMPUTER PROGRAM PRODUCTS FOR IMPROVED MESH GENERATION IN CONSTRUCTED 3D IMAGES

CROSS REFERENCE TO RELATED APPLICATION

This application is a 35 U.S.C. § 371 national stage application of PCT International Application No. PCT/US2018/019377, filed on Feb. 23, 2018, the content of which is incorporated herein by reference in its entirety. The above-referenced PCT International Application was published in the English language as International Publication No. WO 2019/164501 A1 on Aug. 29, 2019.

FIELD

Various embodiments described herein relate to methods and devices for image processing and, more particularly, to creating three-dimensional (3D) images.

BACKGROUND

There are multiple environments in which 3D models of real physical objects may, be useful. For example, 3D printing may make allow the generation of a model of an object based on a generated 3D representation of the object. As another example, immersive computing environments may use 3D models to represent and/or display real objects in a 3D virtual space. Generating a 3D model of a physical object may involve using a camera to record images of the physical object, and mapping a shape and surface of the object in virtual space. One such method to map the object to virtual space is a technique known as Simultaneous Localization and Mapping (SLAM).

SLAM relates to the process of constructing or updating a map of an object while a user's location is non-static in the environment. In mono-camera systems, image-based positioning algorithms may use SLAM techniques to create 3D images for augmented reality, 3D printing, 3D model development, and other applications. SLAM techniques may include the baseline initialization of an inferred 3D image from two-dimensional (2D) coordinates. By inferring the 3D image from the 2D coordinates, a 3D model may be generated from a series of 2D images from a camera, which can allow the generation of a 3D model from the series of images.

Generating the 3D model of the object from the images can be a time-consuming process utilizing large amounts of computer processing power and computer resources. Often the series of 2D images may contain incomplete information about the object. For example, as part of scanning the object to generate the 3D model, only a portion of the object, such as a front or a side, may be available. Methods for generating the 3D model may have difficulty reconstructing parts of the object without sufficient information about portions of the object that may be concealed.

SUMMARY

Various embodiments described herein provide methods, systems, and computer program products for generating a 3D mesh of portions of an object for which there is little or no information.

According to some embodiments described herein, a method includes adding a distribution of additional points to a plurality of points representative of captured portions of the object based on a computational analysis of the plurality of points, and performing a surface reconstruction on the plurality of points and the distribution of additional points to generate a three-dimensional mesh representation of the object that is watertight.

According to some embodiments described herein, an imaging system includes a processor, and a memory coupled to the processor and storing computer readable program code that when executed by the processor causes the processor to perform operations including adding a distribution of additional points to a plurality of points representative of captured portions of an object based on a computational analysis of the plurality of points, and performing a surface reconstruction on the plurality of points and the distribution of additional points to generate a three-dimensional mesh representation of the object that is watertight.

A computer program product for operating an imaging system includes a non-transitory computer readable storage medium having computer readable program code embodied in the medium that when executed by a processor causes the processor to perform the method embodiments described herein.

In some embodiments, adding the distribution of additional points to the plurality of points comprises adding the distribution of additional points to cause the surface reconstruction on the plurality of points to generate the three-dimensional mesh representation such that individual normal values of respective ones of the plurality of points extend in a direction away from a center of the three-dimensional mesh representation.

In some embodiments, adding the distribution of additional points to the plurality of points is performed responsive to an analysis of a plurality of keyframe images of the object that were used to generate the plurality of points.

In some embodiments, the analysis of the plurality of keyframe images comprises determining an angular range of orientations of the keyframe images with respect to the object.

In some embodiments, the angular range represents an amount of surface area of the object that is represented by the plurality of keyframe images.

In some embodiments, adding the distribution of additional points to the plurality of points is performed responsive to determining that the angular range is less than a predetermined threshold.

In some embodiments, adding the distribution of additional points to the plurality of points based on the computational analysis of the plurality of points includes determining a point cloud normal for the plurality of points, determining a center of gravity for the plurality of points, generating a containing shape for the plurality of points based on the center of gravity, and adding the distribution of additional points on a surface of the containing shape relative to the point cloud normal.

In some embodiments, determining the point cloud normal for the plurality of points comprises summing respective normal values for each point of the plurality of points.

In some embodiments, the point cloud normal is a weighted average of individual normals of respective ones of the plurality of points.

In some embodiments, determining the center of gravity for the plurality of points, comprises summing coordinates in x, y, and z directions for each point of the plurality of points and then dividing the sum by a number of points in the plurality of points.

In some embodiments, generating the containing shape for the plurality of points based on the center of gravity comprises generating a virtual sphere centered at the center of gravity and having a radius of sufficient length to contain the plurality of points.

In some embodiments, the containing shape is a containing sphere, and adding the distribution of additional points on the surface of the containing sphere includes establishing a equator for the containing sphere to divide the containing sphere into two hemispheres, and adding the distribution of additional points to a first hemisphere of the two hemispheres.

In some embodiments, the first hemisphere is adjacent the equator in a direction opposite the point cloud normal.

In some embodiments, the equator is placed on a plane that contains the center of gravity and extends in a direction that is perpendicular to the point cloud normal.

In some embodiments, adding the distribution of additional points to the first hemisphere includes establishing a standoff region within the first hemisphere, and adding the distribution of additional points uniformly in areas of the first hemisphere that exclude the standoff region.

In some embodiments, adding the distribution of additional points to the first hemisphere includes designating uniform latitudes within the first hemisphere that are parallel to the equator, and adding the distribution of additional points uniformly along at least one of the uniform latitudes.

In some embodiments, the surface reconstruction is a Poisson Surface Reconstruction.

In some embodiments, the operations further include receiving the keyframe images of the object over a communication network.

Advantageously, these embodiments may quickly refine a 3D model to add portions of the model for which information is missing or lacking. For example, these operations may not require unnecessary calculations for generating additional portions of a mesh representation so as to make it watertight. These operations may thus simplify and expedite the generation of a 3D model, and may reduce processing time and resources by more quickly refining the 3D model.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

The above and other objects and features will become apparent from the following description with reference to the following figures, wherein like reference numerals refer to like parts throughout the various figures unless otherwise specified.

DETAILED DESCRIPTION

Figure 1:
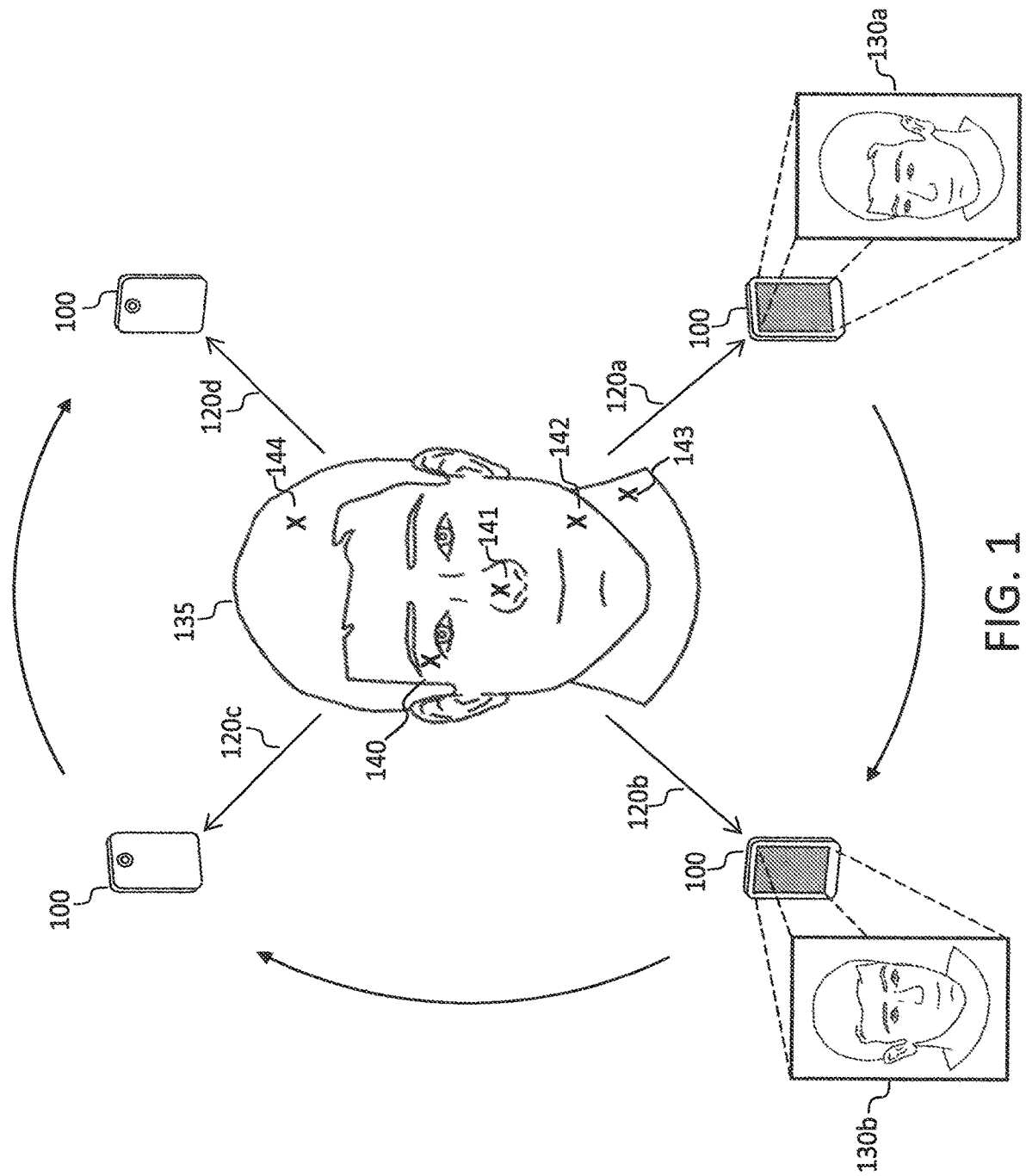
FIG. 1 illustrates the use of a camera as part of a 3D construction of an object, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Applications such as 3D imaging, mapping, and navigation may use SLAM, which provides a process for constructing and/or updating a map of an unknown environment while simultaneously keeping track of an object's location within it. This computational problem is recognized to be a "chicken-and-egg" problem since the object may be moving and the environment may be changing. 2D images of real objects may be captured with the objective of creating a 3D image that is used in real-world applications such as augmented reality, 3D printing, and/or 3D visualization with different perspectives of the real objects. The generated 3D representation of the objects may be characterized by feature points that are specific locations on the physical object in the 2D images that are of importance for the 3D representation such as corners, edges, center points, and other specific areas on the physical object. There are several algorithms used for solving this computational problem associated with 3D imaging, using various approximations. Popular approximate solution methods include the particle filter and Extended Kalman Filter (EKF). The particle filter, also known as a Sequential Monte Carlo (SMC), linearizes probabilistic estimates of data points. The Extended Kalman Filter is used in non-linear state estimation in applications including navigation systems such as Global Positioning Systems (GPS), self-driving cars, unmanned aerial vehicles, autonomous underwater vehicles, planetary rovers, newly emerging domestic robots, medical devices inside the human body, and/or imaging systems. Imaging systems may generate 3D representations of an object using SLAM techniques by performing a transformation of the object in a 2D image to produce a representation of a physical object. The 3D representation may ultimately be a mesh that defines a surface of the representation of the object.

In general, it may be preferable to generate 3D representations that are referred to as being "watertight." Watertight means that the mesh used as part of the 3D representation is complete within a perimeter defined by its surfaces and the mesh properly connects to adjacent surfaces around the perimeter so that the volume of the mesh is fully enclosed. As used herein, a watertight 3D representation is a representation in which all, or almost all, of the surface is represented by a contiguous surface. Stated another way, a watertight 3D representation of the object is such that there are no gaps or missing pieces in the surface of the 3D representation. The "watertight" designation exemplifies a comparison to a real-world object in which, if the real-world object were filled with water, the water would not leak through a gap and/or hole in the surface of the object. Similarly, systems generating 3D representations attempt to generate watertight configurations in which there are no gaps and/or holes.

However, the underlying 2D images used to create the 3D representation may not contain all of the information for the object being scanned. For example, a 2D image of a particular object may only be taken from one side of the object, or only capture a portion (e.g., the front) of the object. This can be problematic, since portions of the object that are not scanned cannot be reconstructed without approximation. In some embodiments, systems generating 3D representations attempt to make 3D representations watertight even when all of the information about the object being represented is not present. In these circumstances, portions of the 3D representations will be approximated, as discussed more herein, to generate the portions of the 3D representation that are missing.

Various embodiments described herein may arise from recognition that an analysis and modification of the data used to generate the 3D mesh representation can improve the quality of the generated mesh representation of the object and/or reduce the time to generate the mesh representation. By identifying that approximations used to make a mesh watertight may result in an incomplete or damaged mesh representation, the approximations may be improved and the overall processing may be streamlined.

The 2D images used in the methods, systems, and computer program products described herein may be captured with image sensors. Image sensors may be collocated with or integrated with a camera. The terms "image sensor," and "camera" will be used herein interchangeably. The camera may be implemented with integrated hardware and/or software as part of an electronic device, or as a separate device. Types of cameras may include mobile phone cameras, security cameras, wide-angle cameras, narrow-angle cameras, stereoscopic cameras and/or monoscopic cameras.

Generating a 3D mesh of a physical object may involve the use of a physical camera to capture multiple images of the physical object. For instance, the camera may be rotated around the physical object being scanned to capture different/portions perspectives of the physical object. Based on the generated images, a mesh representation of the physical object may be generated. The mesh representation may be used in many different environments. For example, the model of the physical object represented by the mesh representation may be used for augmented reality environments, 3D printing, entertainment and the like.

FIG. 1 illustrates the use of a camera 100 as part of a 3D construction of an object 135, according to various embodiments described herein. For example, as illustrated in FIG. 1, a camera 100 may be used to take a series of images (e.g., 130a, 130b) of the object 135, such as a person's face or other object, at location 120a. The camera 100 may be physically moved around the object 135 to various locations such as location 120b, location 120c, and/or location 120d. Though only four camera locations are illustrated in FIG. 1, it will be understood that more or fewer camera locations may be used to capture images of the object 135. In some embodiments, the object 135 may be moved in relation to the camera 100. One or more images of the object 135 may be captured at each location. For example, image 130a may be captured when the camera 100 is at location 120a and image 130b may be captured when the camera 100 is at location 120b. Each of the captured images may be 2D images. There may be a continuous flow of images from the camera 100 as the camera 100 moves around the object 135 that is being scanned to capture images at various angles. Once the images, such as images 130a and 130b are captured, the images may be processed by a processor in camera 100 or a processor external to the camera 100 to generate a 3D image. In some embodiments, a baseline initialization of the 3D image may occur once the first two images are captured. The quality of the baseline initialization is evaluated to see if a satisfactory baseline initialization has occurred. Otherwise, further processing of additional images may take place.

In some embodiments, the baseline initialization may indicate the object 135 to be scanned, as well as overall rough dimensions of the object 135. An initial mesh representation may be formed to enclose the dimensions of the object 135, and further images may be repeatedly processed to refine the mesh representation of the object 135.

The images may be processed by identifying points on the object 135 that were captured the first image 130a, the second image 130b, and/or subsequent images. The points may be various edges, corners, or other points on the object 135. The points are recognizable locations on the physical object 135 that may be tracked in various images of the physical object 135. Still referring to FIG. 1, points on the object 135 may include points 140 through 144. When the camera 100 moves to a different location 120b, another image 130b may be captured. This same process of capturing images and identifying points may occur on the order of tens, hundreds, or thousands (or more) of times in the context of creating a 3D representation. The same points 140 through 144 may be identified in the second image 130b. The spatial coordinates, for example, the X, Y, and/or Z coordinates, of the points 140 through 144 may be estimated using various statistical and/or analysis techniques.

Figure 2C:
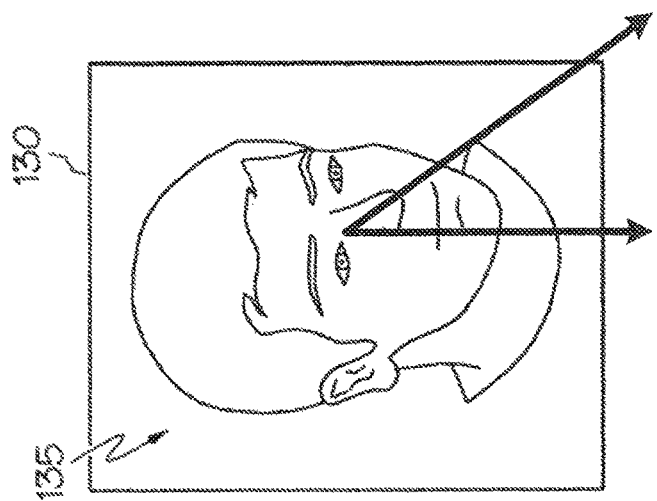
FIGS. 2A, 2B, and 2C illustrate examples of keyframe images used to generate a 3D mesh, according to various embodiments described herein.
Figure 2B:
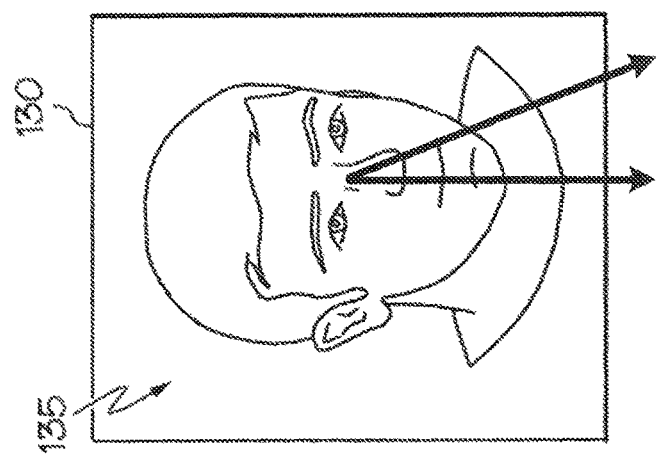
Figure 2A:
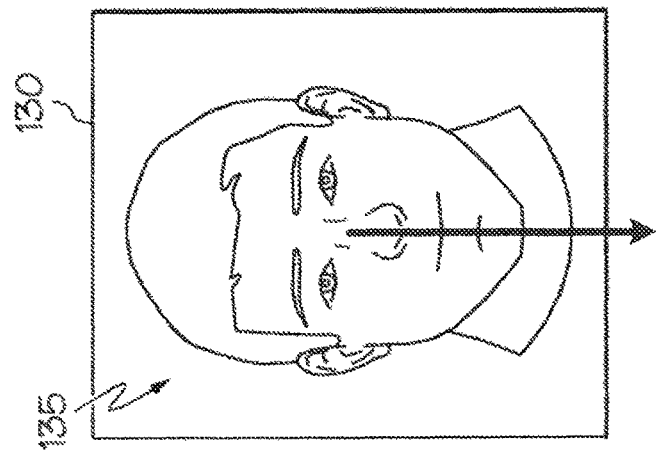

FIGS. 2A, 2B, and 2C illustrate various images, referred to as keyframe images 130, of an object 135. From among the series of images taken as discussed with respect to FIG. 1, specific images known as keyframe images 130 may be selected. A keyframe image 130 may be an anchor frame, selected from among the many pictures taken of the object 135 based on certain criteria, like a stable pose, and/or even light, color, and/or physical distribution around the object. The keyframe images 130 may be a subset of all of the images (e.g., images 130a, 130b of FIG. 1) that are taken of the object 135. The keyframe images 130 may be stored with additional metadata, such as, for example, the pose information of the camera that captured the image. The pose information may indicate an exact location in space where the keyframe image 130 was taken.

Referring now to FIG. 2A, in a first keyframe image 130, the object 135 is oriented straight at the camera. Referring now to FIG. 2B, in a second keyframe image 130, the camera is offset from a perpendicular (e.g., straight-on) view of the object 135 by about 30 degrees. Referring now to FIG. 2C, in a third keyframe image 130, the camera is offset from a perpendicular (e.g., straight-on) view of the object 135 by about 45 degrees. Thus, keyframe images 130 of FIGS. 2A, 2B, and 2C illustrate approximately 45 degrees of the object 135.

Figure 3:
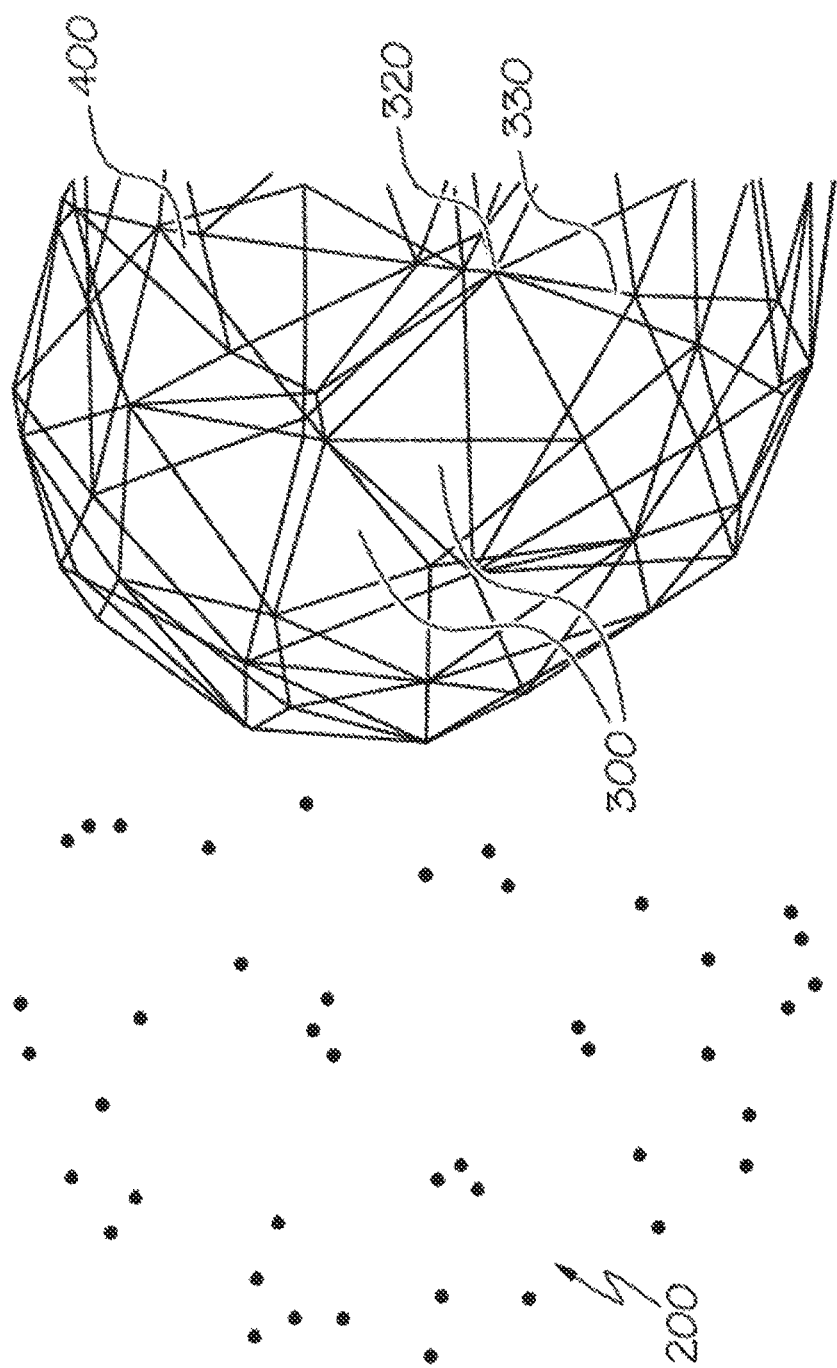
FIG. 3 illustrates an example of formulating a 3D mesh from a point cloud.

FIG. 3 illustrates the generation of a point cloud 200 and mesh representation 400 based on a 2D image, according to various embodiments described herein. As illustrated in FIG. 3, analysis of the orientation and position information of a set of images (e.g., images 130a and 130b of FIG. 1) may result in the identification of points (e.g., points 140 through 144 of FIG. 1), which may collectively be referred to as point cloud 200, which is a plurality of points 200 identified from respective images of the object 135. From these identified plurality of points 200, characteristics of the mesh representation 400 of the object 135 may be updated. As described herein, the mesh representation 400 may be composed of a plurality of polygons 300 including edges 330 and vertices 320.

Respective vertices 320 of the mesh representation 400 may be associated with the surface of the object 135 being scanned and tracked. The point cloud 200 may represent contours and/or other features of the surface of the object 135. Operations for generating a mesh representation 400 of the object 135 may attempt to map the point cloud 200 extracted from a 2D image of the object 135 onto the polygons 300 of the mesh representation 400. It will be recognized that the mesh representation 400 is incrementally improved based on subsequent images, as the subsequent images provide additional points to the point cloud 200 which may be mapped to the plurality of polygons 300 of the mesh representation 400.

Refining the mesh representation 400 given a point cloud 200 may involve mathematically projecting the 3D location of the plurality of points 200 inferred from an image into and/or onto the mesh representation 400. For each point of the plurality of points 200, an analysis may be performed to determine whether the point lays on the mesh representation 400, or whether the point is off (e.g., above/below/beside in a 3D space) the mesh representation 400. If the point is on the mesh representation 400, the point may be associated with a polygon of the polygons 300 of the mesh representation 400 that contains the point. If the point is off the mesh representation 400, it may indicate the mesh representation 400 needs to be adjusted. For example, the point may indicate that the arrangement of the polygons 300 of the current mesh representation 400 is inaccurate and needs to be adjusted.

In some embodiments, to adjust the mesh representation 400, a vertex 320 of one of the polygons 300 of the mesh representation 400 may be moved to a location in 3D space corresponding to the point of the point cloud 200 being analyzed, but the present inventive concepts are not limited thereto. In some embodiments, to adjust the mesh representation 400, the polygons 300 of the mesh representation 400 may be reconfigured and/or new polygons 300 added so as to include a location in 3D space corresponding to the point of the point cloud 200 being analyzed in the surface of the mesh representation 400. In some embodiments, the adjustment of the mesh representation 400 may be weighted so that the mesh representation 400 moves toward, but not entirely to, the location in 3D space corresponding to the point of the point cloud 200 being analyzed. In this way, the mesh representation 400 may gradually move towards the points of a point cloud 200 as multiple images are scanned and multiple point clouds 200 are analyzed.

Once the mesh representation 400 has been generated, it may be iteratively improved. For example, the mesh representation 400 may not be watertight. For example, if the images (see, e.g., keyframe images 130 of FIGS. 2A-C) do not fully capture the object, then the point cloud 200 may not generate a mesh representation 400 that fully represents the full surface of the object. Methods, devices, and computer program products described herein may iteratively improve a generated mesh representation 400 by efficiently making it watertight.

Figure 4A:
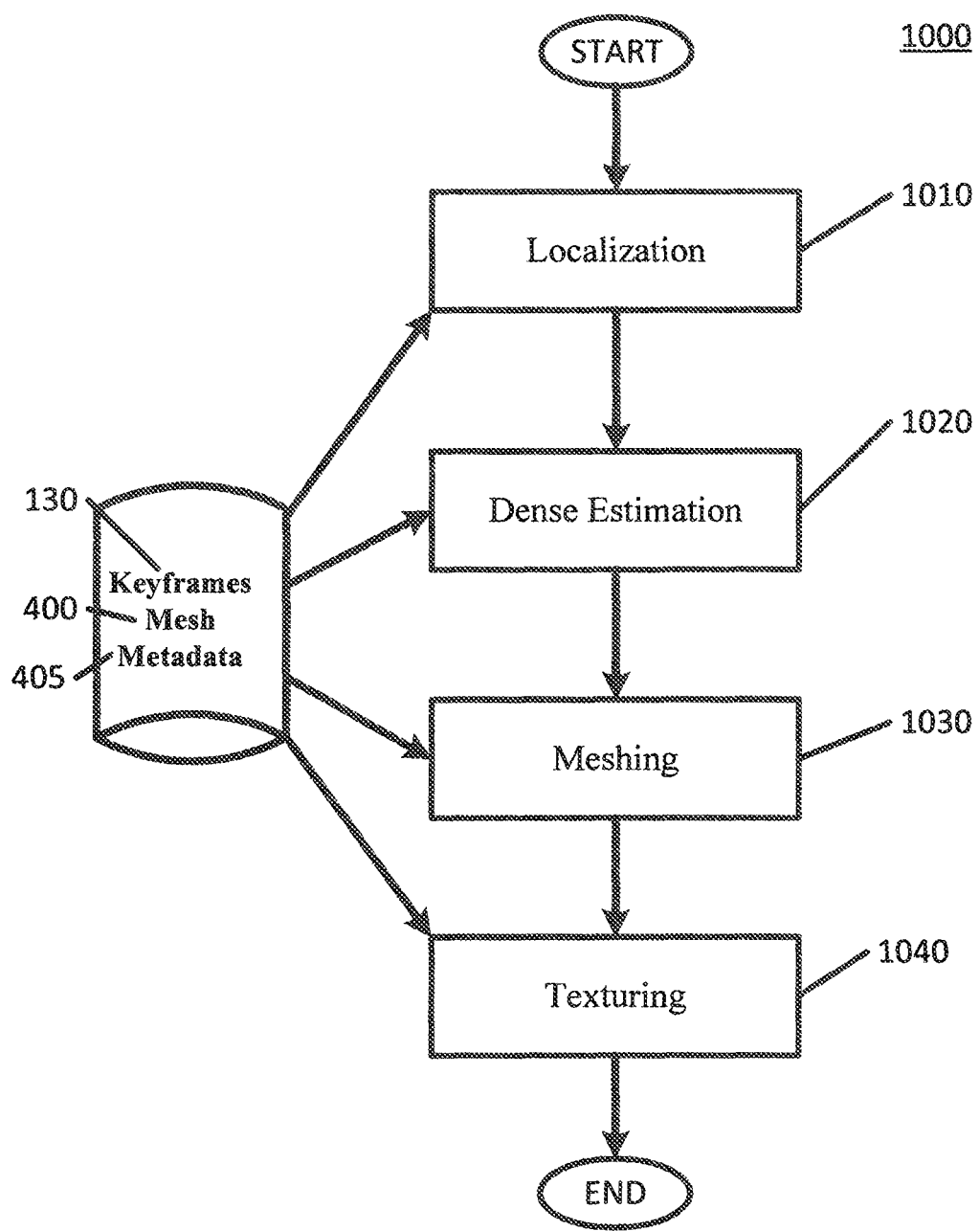
FIG. 4A is flowchart of operations for iteratively improving a 3D mesh from a series of 2D images, according to various embodiments described herein.

FIG. 4A is flowchart of operations 1000 for improving a 3D mesh representation from a series of 2D images, according to various embodiments described herein. As illustrated in FIG. 4A, the process may take as input one or more of keyframe images 130, an initial mesh representation 400, and/or metadata 405.

As discussed with respect to FIG. 3, the initial mesh representation 400 may be a 3D mesh representation of a 3D object based on a series of captured images. As discussed with respect to FIGS. 2A-C, the keyframe images 130 may be particular ones of the series of captured images used to generate the mesh representation 400. The metadata 405 may include various types of information related to the keyframe images 130 and the mesh representation 400. For example, metadata 405 may include identified feature points on the mesh representation 400. In some embodiments, feature points my indicate features of an underlying image that stand out, such as high contrast areas and/or edges of the image. Feature points may be used to track a particular portion of an object across multiple images to help in surface and location identification. Once a feature point is seen in many images, it can be triangulated in 3D space. In some embodiments, the metadata 405 may also contain additional information related to the formulation of the mesh representation 400. Though illustrated as a separate element, in some embodiments, the metadata 405 may include the mesh representation 400.

Referring to FIG. 4A, the operations 1000 to improve the initial mesh representation 400 may include block 1010 for localization. In some embodiments, localization 1010 may include analysis of the mesh representation 400 and keyframe images 130 to determine if there are errors and/or other imperfections in the mesh representation 400 related to the positioning of the camera (e.g., camera 100 of FIG. 1). By analyzing the keyframe images 130, specific objects or features represented in the keyframe images 130 may be identified, and the position and orientation of the object (e.g., object 135 of FIG. 1) relative to some coordinate system may be determined. The combination of position and orientation may be referred to as the pose of the camera. By analyzing the initial mesh representation 400 and the pose of the camera with respect to the object in the various keyframe images 130, reprojection errors in the mesh representation 400 can be identified and minimized. A reprojection error is a geometric error corresponding to a distance within an image between a projected point and a measured one. The reprojection error may be used to quantify how closely an estimate of the location of a point in the mesh representation 400 recreates the point's true location on the 3D object.

After localization 1010, the operations 1000 for improving the mesh representation 400 may continue with dense estimation 1020. In dense estimation 1020, individual ones of the keyframe images 130 may be analyzed and compared with adjacent keyframe images 130. As used herein, adjacent keyframe images 130 refer to one or more keyframe images 130 that represent images taken of the object from physically adjacent positions in the 3D space surrounding the object. Individual keyframe images 130 may be analyzed respective to adjacent keyframe images 130 to establish an estimate of the depth of the object and/or the placement of the object within a 3D coordinate system. In some embodiments, the dense estimation 1020 may result in a generation of a point cloud (e.g., point cloud 200 of FIG. 3) for a given keyframe image 130. Upon output of the dense estimation 1020, a location in a 3D coordinate space may be known and/or determined for each point of the point cloud. In addition, for each point of the point cloud, a normal may be determined. As used herein a normal for a point is a vector that is perpendicular to a surface of theoretical plane that includes the point and is tangential to the surface of the object. Stated another way, the normal for a given point may indicate an "outward" perpendicular direction from the surface of the object at the given point.

After dense estimation 1020, the operations 1000 for improving the mesh representation 400 may continue with meshing 1030. As described herein, the analysis of the keyframe images 130 may result in a series of point clouds. During meshing 1030, each of these points clouds may be combined to generate an improved mesh representation of the object.

Figure 5A:
FIGS. 5A, 5B, 5C, and 5D illustrate an example of combining point clouds to generate a 3D mesh, according to various embodiments described herein.
Figure 5B:
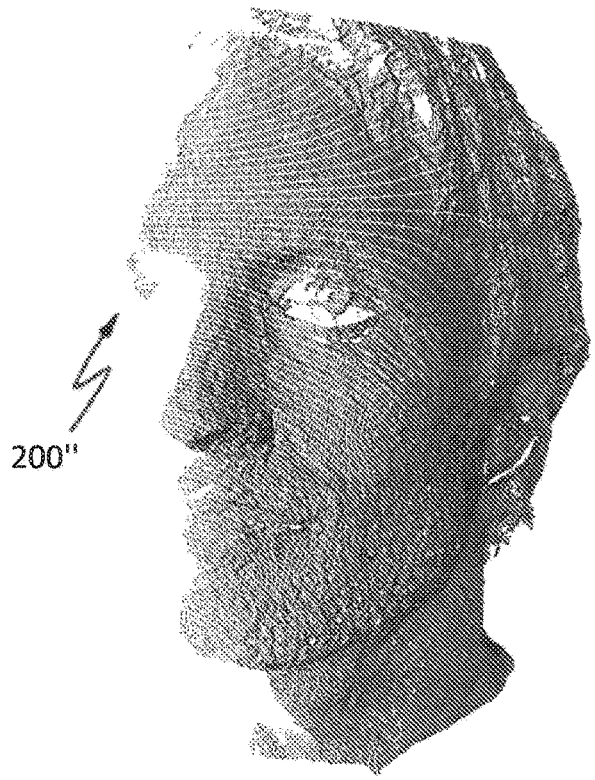

FIGS. 5A, 5B, 5C, and 5D illustrate an example of combining point clouds to generate a 3D mesh representation, according to various embodiments described herein. FIG. 5A illustrates an example point cloud 200'. As described herein, the point cloud 200' may be generated based on a keyframe image 130 taken from a series of images of an object. As illustrated in FIG. 5A, the point cloud 200' may include a series of points that are associated with only a first portion of the object, in this example a portion of a face. FIG. 5B illustrates a second example point cloud 200" that includes a series of points that are associated with a second portion of the object, different from the first portion. Thus, the point clouds 200' and 200" illustrated in FIGS. 5A and 5B represent different portions of a same object based on images taken from different perspectives. The point clouds 200' and 200" may be generated from individual keyframe images 130 taken of the object from different angles. Reference is made to FIGS. 2A-C that illustrate example keyframe images 130 that may generate point clouds such as those illustrated in FIGS. 5A and 5B. Though the point clouds 200' and 200" correspond to different perspectives of the object, it should be noted that the perspectives may overlap. That is to say that particular locations on the surface of the object represented in point cloud 200' may also be represented in point cloud 200", albeit from a different angle.

Though FIGS. 5A and 5B illustrate two point clouds 200' and 200", it will be understood that multiple point clouds 200 may be available for generation of the mesh. In some embodiments, a point cloud 200 may exist for every keyframe image 130. In some embodiments, the number of point clouds 200 may be different than the number of keyframe images 130.

Figure 5C:
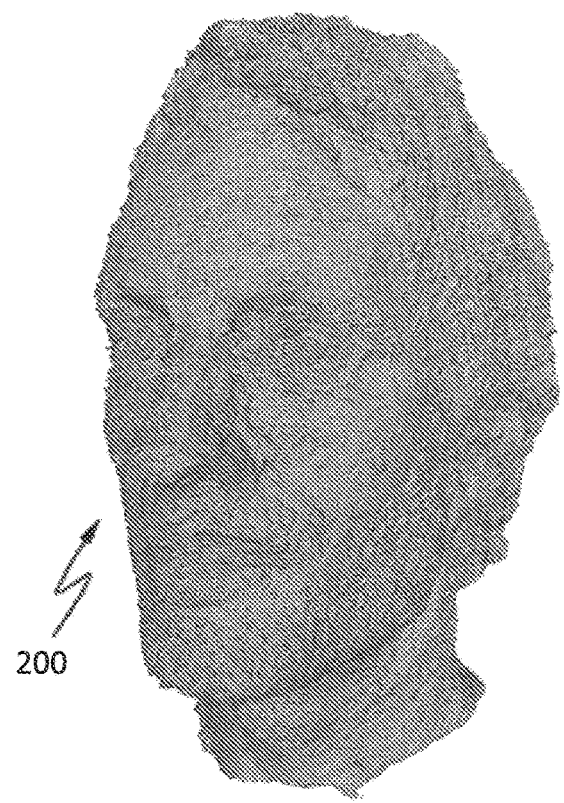

As illustrated in FIG. 5C, the meshing block 1030 may include combining a plurality of the point clouds (e.g. 200' and 200") into a single point cloud 200. The combination of the plurality of the point clouds may be based on a recognition of the pose (e.g., the position and orientation) of the object being represented, the determined location of the various points of the plurality of the point clouds, and/or a recognition that individual points of different point clouds may overlap a same position on the surface of the object. By comparing the coordinates of the points of the plurality of the point clouds, a combined point cloud 200, such as the one illustrated by example in FIG. 5C, may be generated, with each point mapped into a common 3D coordinate system.

Once a common point cloud 200 is determined, a mesh representation 400 may be generated based on the point cloud 200. The purpose of the mesh generation is to develop a mesh representation 400 that most closely matches the point cloud 200 and also provides approximations of the surface of the mesh representation 400 for which there is no information (e.g., gaps in the mesh representation 400). As discussed with respect to FIG. 3, generation of the mesh representation 400 may include an analysis of the individual points of the point cloud 200 to construct a 3D surface of the mesh representation 400.

Multiple techniques exist for reconstructing a 3D surface from a series of point samples. One such method is Poisson Surface Reconstruction, described in "Poisson Surface Reconstruction" by Kazhdan, Bolitho, and Hoppe, published in the Proceedings of the Fourth Eurographics Symposium on Geometry Processing in June, 2006. Poisson Surface Reconstruction generates a mesh representation 400 from a point cloud 200 by casting the individual points of the point cloud 200 as a spatial Poisson problem. Poisson Surface Reconstruction utilizes the location of the points of the point cloud 200, as well as the determined normals for each of the points of the point cloud 200 to estimate a surface of the object represented by the point cloud 200. The goal of the Poisson Surface Reconstruction is to digitally reconstruct a mesh representation 400 with a smooth surface based on a large number of points $p_i$ of the point cloud 200 where each point also carries an estimate of the local normal $n_i$. Poisson Surface Reconstruction can reconstruct an implicit function $f$ whose value is zero at the points $p_i$ and whose gradient at the points $p_i$ equals the normal vectors $n_i$. The set of ($p_i$, $n_i$) is thus modeled as a continuous vector field V. The implicit function $f$ is found by integrating the vector field V. However, as V may not be generally integrable (i.e., it is not curl-free), a best least-squares approximate solution may be found using the Poisson equation.

Figure 5D:
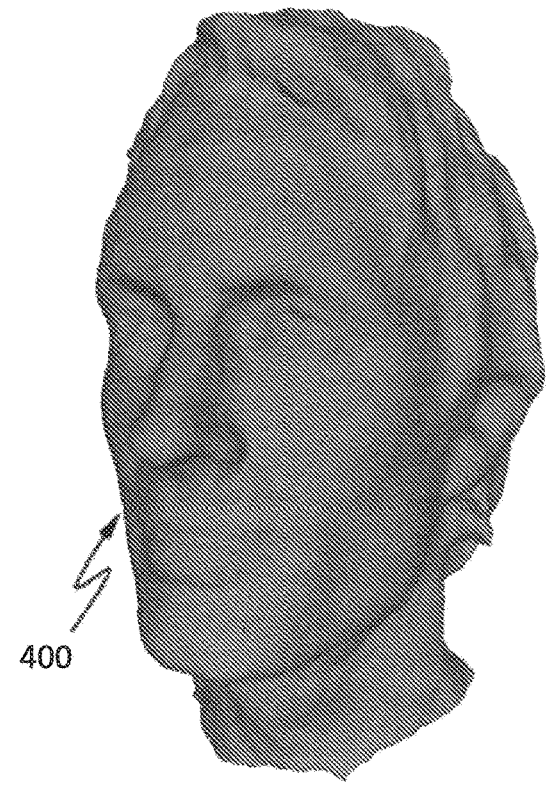

Poisson Surface Reconstruction provides a statistical model which generates a mesh representation 400 that approximates a surface of the object. FIG. 5D illustrates a mesh representation 400 that is generated by Poisson Surface Reconstruction from the point cloud 200 of FIG. 5C. Though the present application describes the use of Poisson Surface Reconstruction to generate a mesh representation 400 from a point cloud 200, it will be understood that other surface construction models are available. Thus, the present application is not limited to the use of Poisson Surface Reconstruction, and other methods for surface reconstruction may be used in conjunction with the embodiments described herein without deviating from the present inventive concepts. For example, the present inventive concepts may be used with, but are not limited to, surface reconstruction algorithms including radial basis functions (RBF), moving least squares (MLS), multi-level partition of unity (MPU), ball-pivoting algorithm (BPA), Voronoi-based algorithms, and the like. Surface reconstruction algorithms which may be used with respect to the present inventive concepts are described in "State of the Art in Surface Reconstruction from Point Clouds," by Matthew Berger, et al., published in Eurographics 2014—State of the Art Reports (April 2014).

Figure 6A:
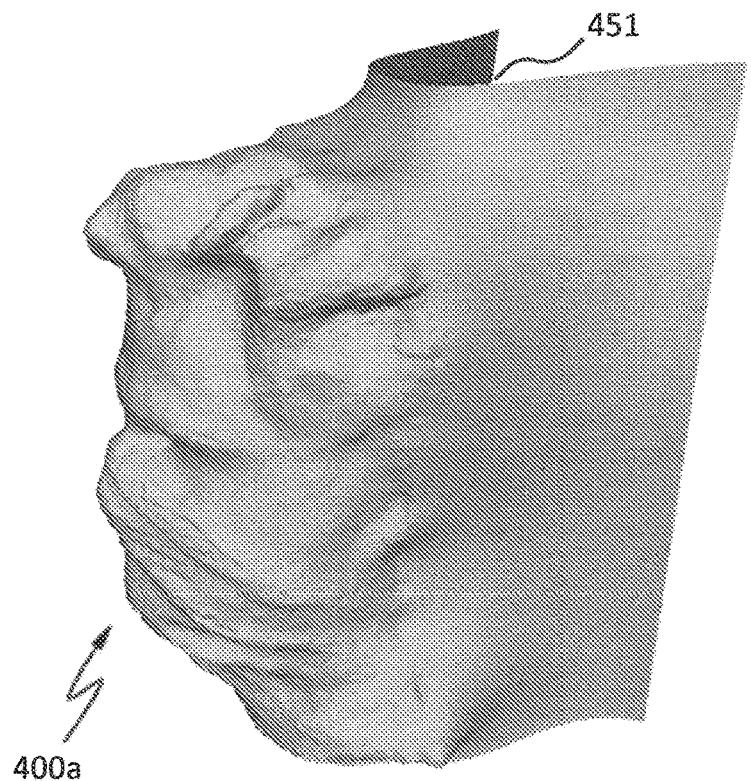
FIGS. 6A and 6B illustrate an example of generating additional portions of a 3D mesh as to make the 3D mesh watertight.

As discussed herein, one goal of surface reconstruction techniques is the approximation of portions of the representation of the object that are missing. For example, FIG. 6A illustrates a mesh representation 400a that is generated from a scan in which the entirety of the object was not represented. As discussed herein, the mesh representation 400a is not watertight, and a gap 451 exists at a portion (e.g., the back of the object) of the mesh representation 400a. In some embodiments, it may be preferable to generate a watertight mesh representation.

Figure 6B:
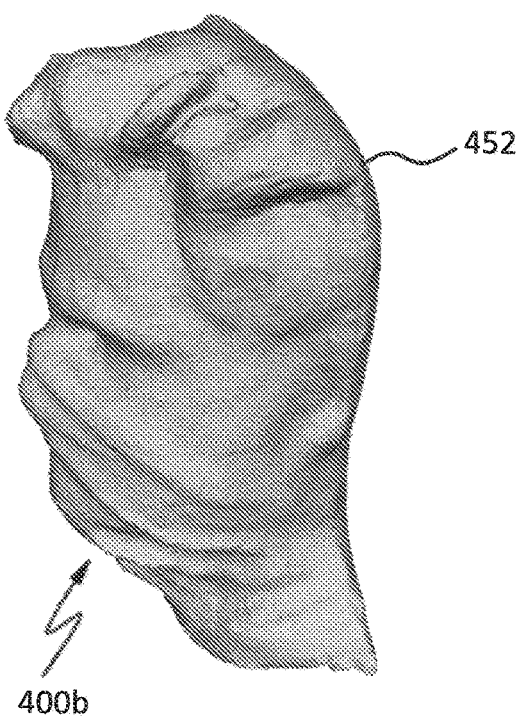

FIG. 6B illustrates a watertight mesh representation 400b that is generated from a same point cloud as was used to generate the mesh representation 400a of FIG. 6A. A difference in the mesh representation 400b is that the mesh representation 400b is watertight. As part of the mesh generation, the surface reconstruction (e.g., Poisson Surface Reconstruction or other surface reconstruction method) may be configured to generate a watertight surface. In some embodiments, the generation of a watertight mesh representation 400b may include generating (e.g., by statistical approximation) the portions of the mesh representation 400b that do not have corresponding points in the point cloud used to generate the mesh representation 400b. That is to say that the surface reconstruction procedures may "fill in" missing pieces of the mesh representation 400b based on a statistical analysis of the points of the point cloud. FIG. 6B illustrates a portion 452 added to the mesh representation 400b to address the portions of the object that were not scanned so as to make the mesh representation 400b watertight.

As illustrated in FIG. 6B, statistical analysis can be used to fill in missing portions of a scanned representation of an object so as to make a watertight mesh representation 400. Embodiments of the present inventive concepts arise from recognition by the inventors that there may be instances in which the amount of an object that is scanned and/or captured may be insufficient to provide the amount of statistical data needed for an accurate generation of missing pieces of the mesh representation 400.

Figure 7A:
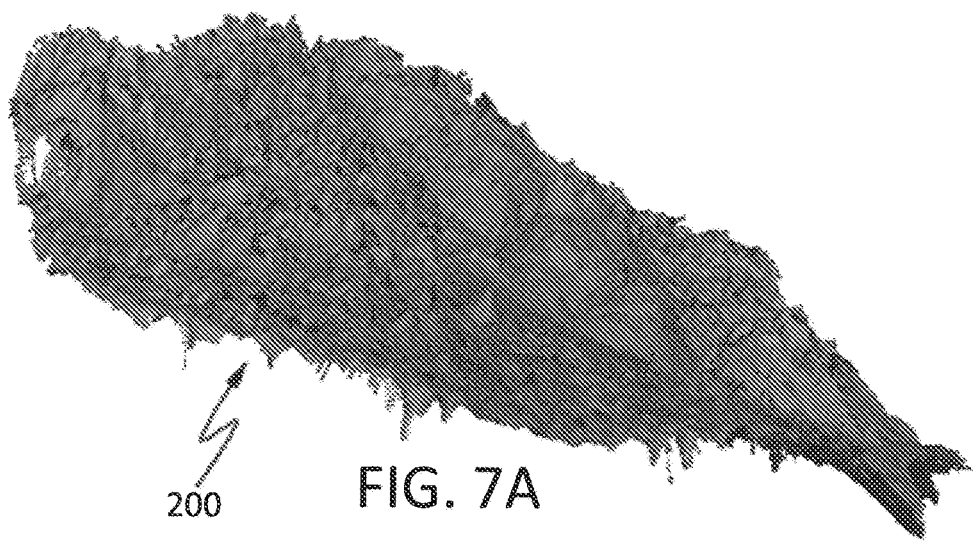
FIGS. 7A and 7B illustrate a point cloud and an example mesh representation which do not include all of the portions of the object being scanned.
Figure 7B:
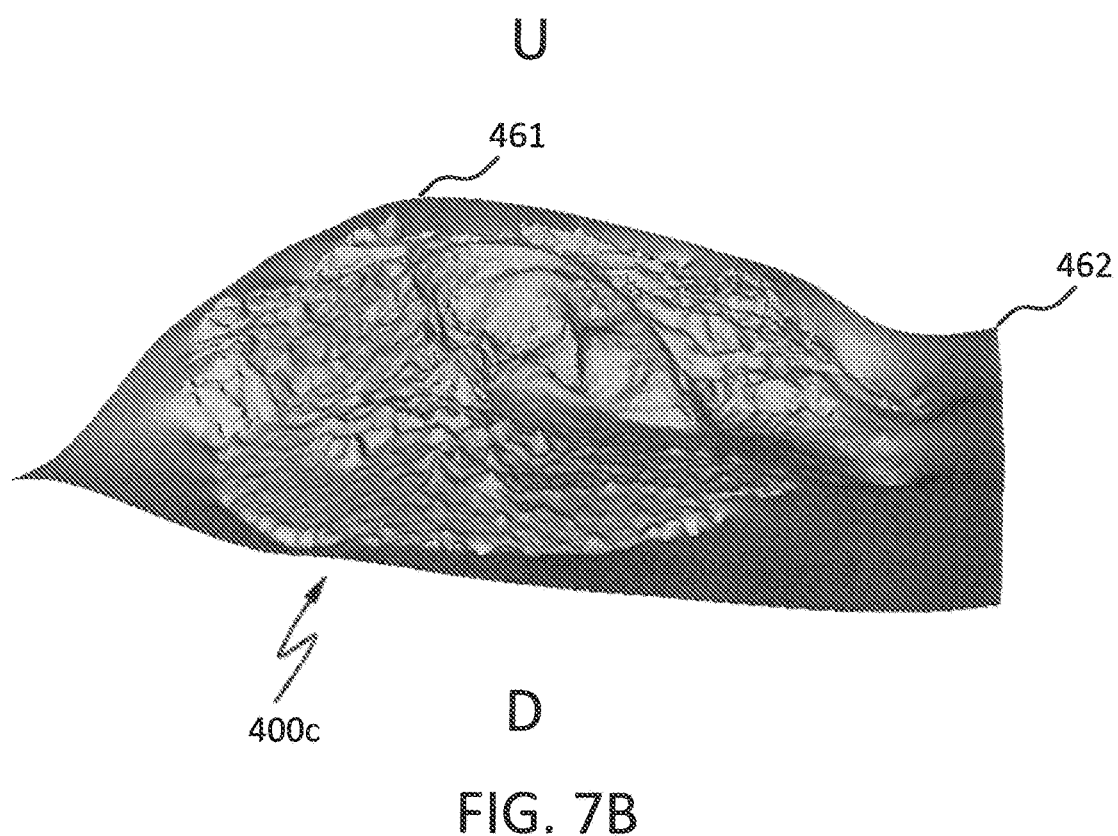

FIG. 7A illustrates an example point cloud 200 which does not include all of the portions of object being scanned, and FIG. 7B illustrates an example mesh representation 400c which may be generated from the point cloud 200 of FIG. 7A. As illustrated in FIGS. 7A and 7B, only a top surface of the object (in this case, an ear) has been scanned. The mesh representation 400C and point cloud 200 of the portion of the object scanned in FIGS. 7A and 7B may be more planar than, for example, the representations in FIGS. 6A and 6B.

As is also illustrated in FIG. 7B, portions 461, 462 of the scanned in object 135 rise upward from a surface of the scan. This may result because edges of a point cloud 200 may include random outliers. A statistical analysis of the points used to generate the mesh representation 400c of FIG. 7B may fill in missing pieces of the mesh representation 400c to make the mesh representation watertight in one of two possibilities. The first possibility is that the missing pieces of the mesh representation 400c may be generated below the mesh representation 400c (e.g., in a downward direction), in the area of FIG. 7B indicated by 'D'. Alternatively, the second possibility is that the additional mesh may be generated above the mesh representation 400c (e.g., in an upward direction), in the area of FIG. 7B indicated by 'U'. In the mesh representation 400c of FIG. 7B, this second possibility may occur because portions of the points that represent the scanned object may trend upward at some locations, such as portions 461 and 462 identified in FIG. 7B.

Figure 8A:
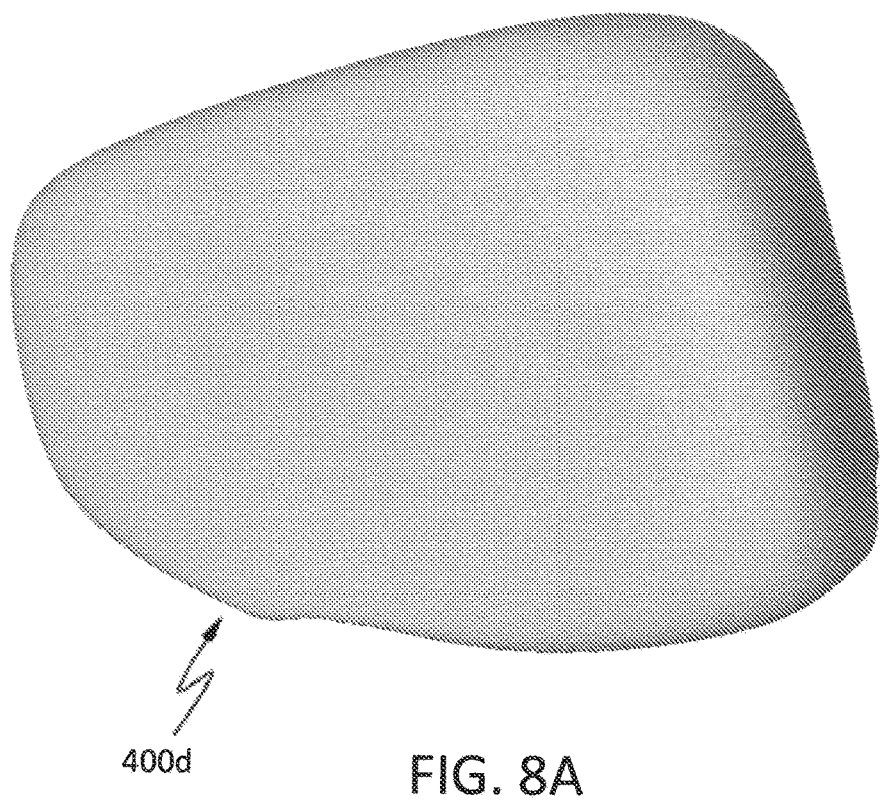
FIGS. 8A and 8B illustrate a problem which can occur during the attempt to make the mesh representation of FIG. 7B watertight.
Figure 8B:
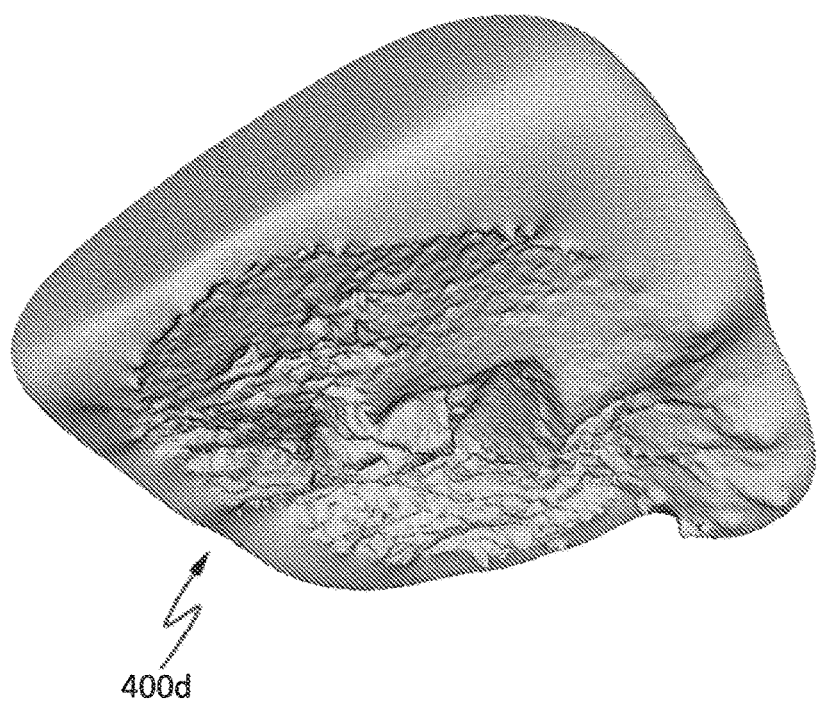

FIG. 8A illustrates this second possibility, in which a mesh representation 400d has an additional mesh generated above, and encapsulating, the portions of the mesh representation 400d that represent the surface of the object. FIG. 8B illustrates the mesh representation 400d from a different angle, illustrating the lower surface of the object (e.g., the ear) illustrated in FIG. 7B. In this case, the surface reconstruction algorithms (e.g., Poisson Surface Reconstruction) are unable to detect an "upper" or a "lower" surface of the scanned object. As such, the reconstruction results in a watertight mesh representation 400d that encapsulates the "upper" surface of the scan and is not usable. Because running the surface reconstruction processes, such as a Poisson Surface Reconstruction, to generate the mesh representations 400c may be resource intensive, such as in terms of processor resources and/or time, the failure of the mesh generation may represent a significant cost. Methods, devices, and computer program products which can correctly detect and accommodate problematic mesh generation scenarios may result in faster and/or higher-quality mesh representations.

Figure 9:
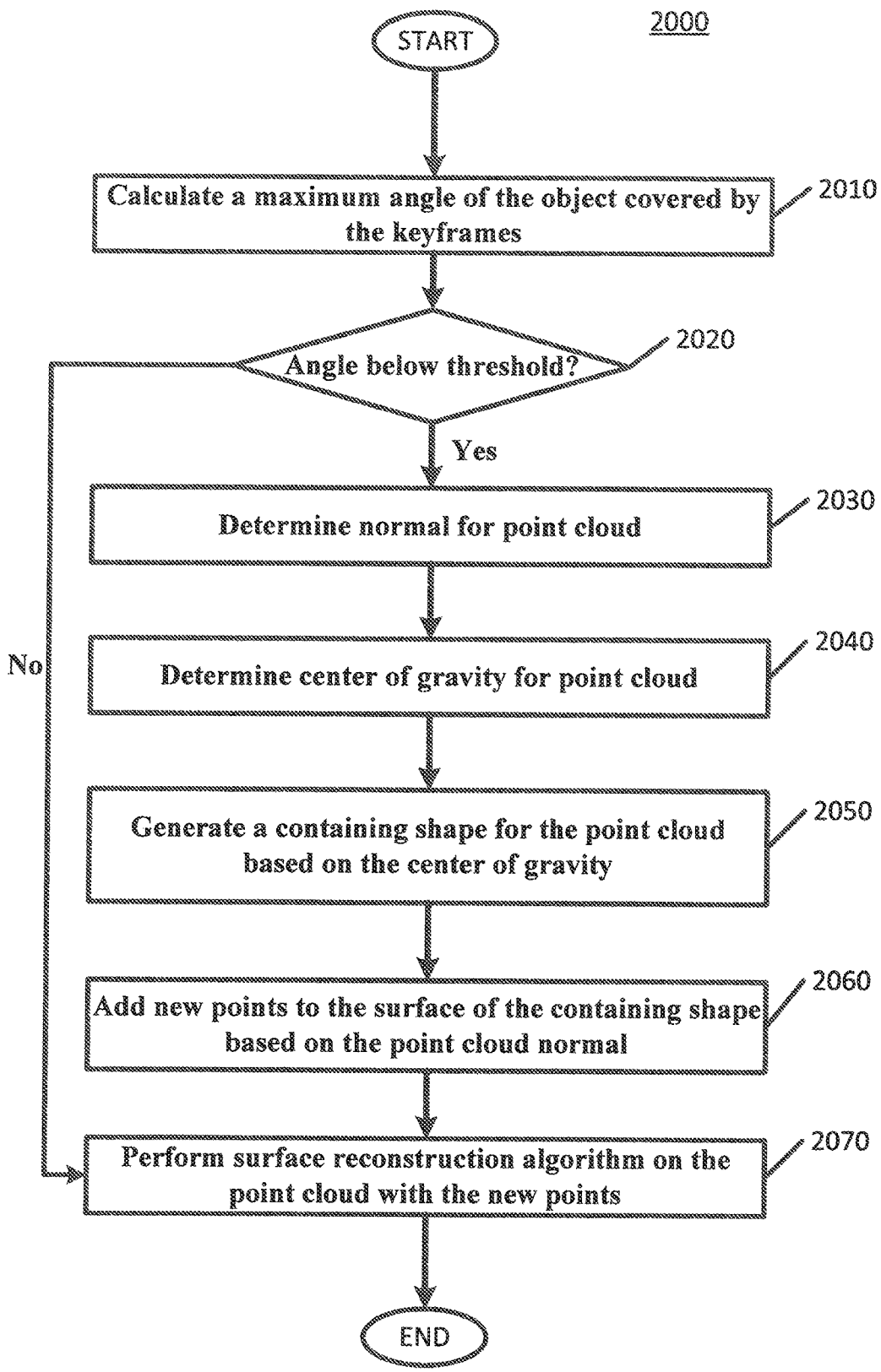
FIG. 9 is a flowchart of further operations for generating additional portions of a 3D point cloud so as to make a watertight 3D mesh, according to various embodiments described herein.

FIG. 9 is a flowchart of further operations 2000 for generating additional portions of a 3D point cloud so as to make a watertight 3D mesh, according to various embodiments described herein. The operations 2000 may be performed, for example, during the meshing block 1030 illustrated in FIG. 4A. The operations 2000 may calculate an angular range encompassing the orientations of the keyframe images with respect to the scanned object. If the angle is below a predetermined threshold, a remediation algorithm may be performed to add additional points to the point cloud associated with the keyframe images to adjust the surface reconstruction.

Figure 10B:
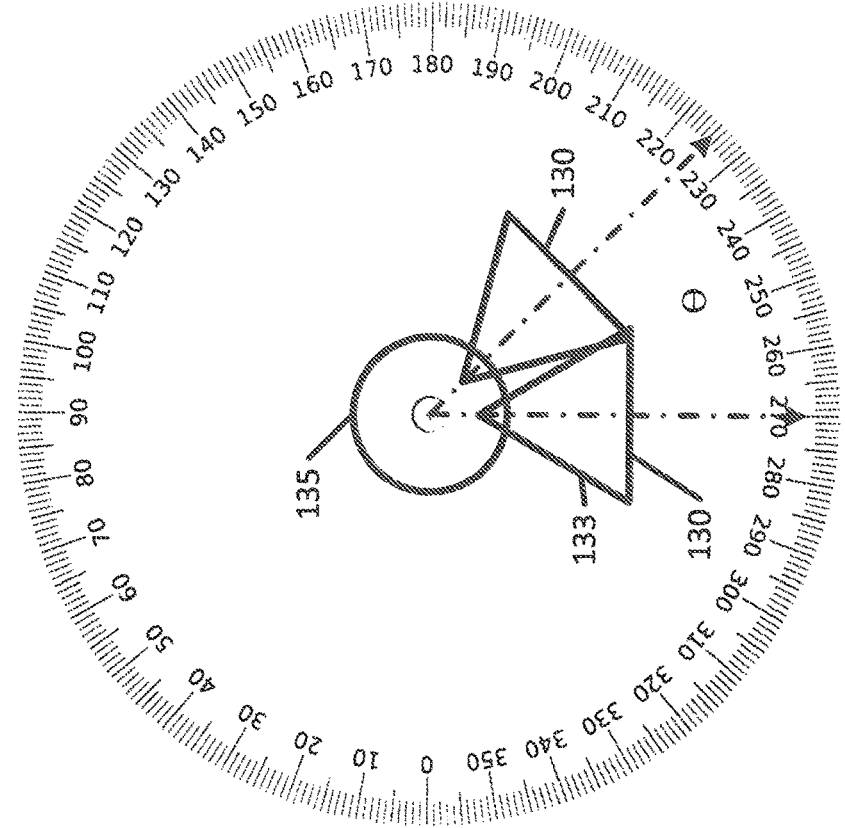
FIGS. 10A and 10B illustrate an example of determining an angular range for the orientation of keyframe images of an object, according to various embodiments described herein.
Figure 10A:
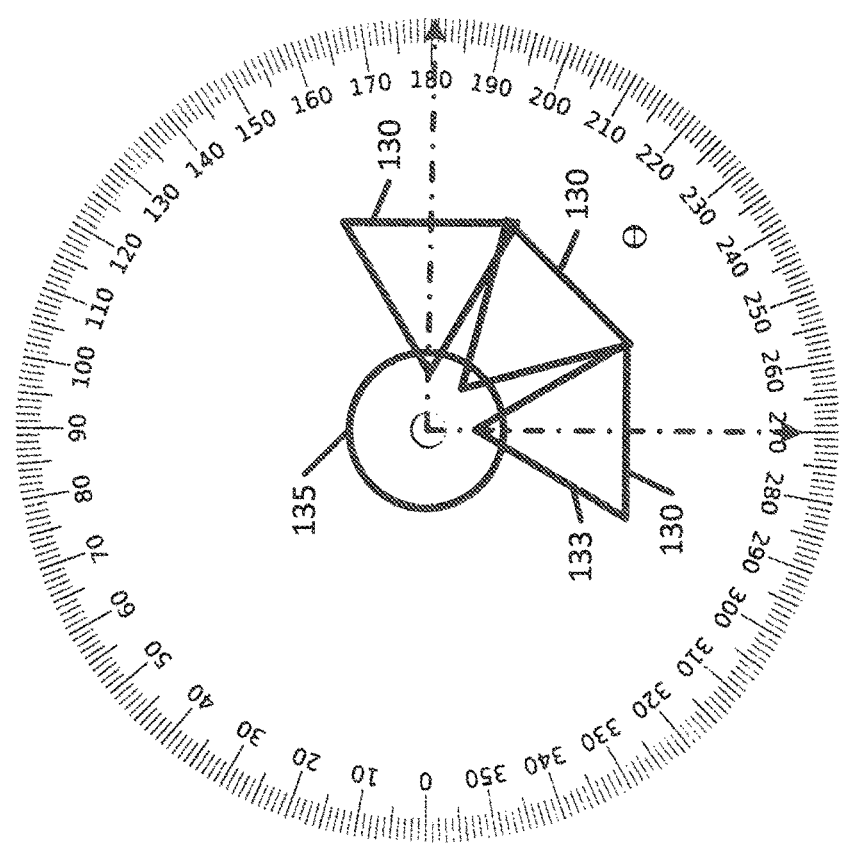

For example, as illustrated in FIG. 9, the operations 2000 for generating additional portions of a 3D point cloud so as to make a watertight 3D mesh may include block 2010 to calculate an angular range of the object covered by the keyframe images (e.g., keyframe images 130 of FIGS. 2A-C). Block 2010 may include analyzing the keyframe images 130 to derive an angle of coverage of the object being scanned. FIG. 10A illustrates a schematic plan view of an example coverage of keyframe images 130 for an object 135. As illustrated in FIG. 10A, the object 135 (represented schematically as a circle) may be captured in one or more keyframe images 130 (represented schematically as a triangle). In FIG. 10A, three keyframe images 130 are illustrated, but the present inventive concepts are not limited thereto. The keyframe images 130 may be images of the object 135 taken from one or more images captured during a scan of the object 135. The keyframe images 130 may have a field of view 133 that captures a portion of the object 135. In some embodiments, the keyframe images 130 that are selected for analysis have the object 135 substantially in the center of the field of view 133 (represented as a vertex of the triangle representing the keyframe image 130) of the keyframe image 130.

As illustrated in FIG. 10A, the plurality of keyframe images 130 can be analyzed to determine how much of the surface of the object 135 is captured. In some embodiments, determining how much of the surface of the object 135 is captured may be based on determining an angular range θ between the orientation of the keyframe images 130 of the object 135. The angular range θ of the keyframe images 130 may be based on an angle of the field of view 133 of the keyframe image 130 with respect to the object 135. In some embodiments, since the keyframe images 130 have the object 135 approximately in the center of the field of view 133, the field of view 133 may indicate an orientation of the keyframe image 130 with respect to the object 135. The angular range θ may be the angle between two farthest keyframe images 130 of a series of keyframe images 130 that capture (e.g., sequentially) the object 135. Stated another way, the angular range θ describes the amount of the object 135 that is captured by the keyframe images 130 represented in a degree format.

In some embodiments, the orientation of a particular keyframe image 130 with respect to the object 135 may be represented as a straight line from a calculated location of the keyframe image 130 in 3D space (e.g., a calculated pose of the camera associated with the keyframe image 130) to the center of the object 135. An angle between two particular keyframe images 130 may be the angle between the respective lines formed from the two particular keyframe images 130 and the center of the object 135. The angular range θ may be a maximum angle between any two keyframes 130 of a plurality of keyframe images 130 of the object 135.

In some embodiments, the angular range θ of the orientation of the keyframe images 130 with respect to the object 135 may be represented by a circle that is schematically laid over the surface of the object. FIGS. 10A and 10B illustrate an example of determining an angular range θ for the orientation of keyframe images 130 of an object 135, according to various embodiments described herein. If the object 135 is represented as occupying the center of a circle, the amount of the surface of the object 135 that is captured by the keyframe images 130 may be represented by the number of degrees of the circle that is captured by the fields of view 133 of the keyframe images 130. In the example illustrated in FIG. 10A, slightly less than ninety degrees of the surface of the object 135 have been captured by the three keyframe images 130. In other words, in FIG. 10A, the angular range θ of the orientation of the keyframe images 130 is approximately ninety degrees FIG. 10B illustrates another embodiment in which keyframe images 130 are taken of the surface of the object 135. As illustrated in FIG. 10B, the two keyframe images 130 capture a smaller portion of the object 135 than the scenario illustrated in FIG. 10A. In the example illustrated in FIG. 10B, the angular range θ of the orientation of the keyframe images 130 with respect to the object 135 is less than fifty degrees. In other words, less than fifty degrees of the surface of the object 135 have been captured by the keyframe images 130.

Referring again to FIG. 9, block 2010 may analyze the angular range θ between the orientation of the keyframe images 130 with respect to the object 135. The angular range θ may be compared to a predetermined threshold value in block 2020. For example, the predetermined threshold may be seventy degrees. In block 2020, if the angular range θ exceeds the threshold, the operations may continue with block 2070 to run the surface reconstruction algorithm (e.g., Poisson surface reconstruction) on the point cloud 200. However, if the angular range θ is less than or equal to the threshold, the operations may continue with block 2030.

Though the above description utilizes an angular range θ threshold that is degree-based to determine the amount of the surface of the object 135 that has been captured by the keyframe images 130, it will be understood that other ways of representing the amount of the surface of the object 135 that has been captured are possible. For example, in some embodiments a percentage of the total surface area of the object 135 may be calculated, and the threshold value may be formulated similarly (e.g., 20%). In some embodiments, the point cloud 200 may be analyzed and compared to a plane. For example, a standard plane may be generated that best fits the distribution of the point cloud 200. Then an analysis may be made of the distribution of error between respective points of the point cloud 200 and the generated plane. If the distribution of error is small, the point cloud 200 may be determined to be relatively planar, and the algorithm further described herein may be performed (e.g., blocks 2030, 2040, 2050, 2060, and 2070 described with respect to FIG. 9).

In addition, though a predetermined threshold value of seventy degrees is described herein, other threshold values are possible without deviating from the present inventive concepts. For example, a predetermined threshold value of eighty degrees, 100 degrees, or 120 degrees may be used without deviating from the inventive concepts.

Figure 11A:
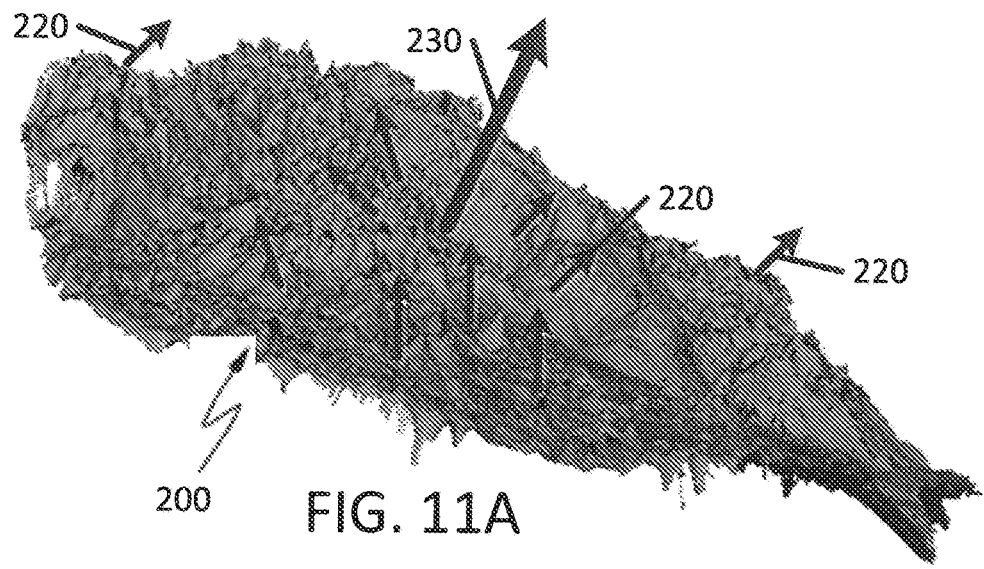
FIG. 11A illustrates an example in which the individual normals of the points of a point cloud may be analyzed to calculate a point cloud normal, according to various embodiments described herein.

In block 2030, a normal for the point cloud 200 may be determined based on a computational analysis of the point cloud 200. Block 2030 is described with respect to FIG. 11A. Referring to FIG. 11A, each point of the point cloud 200 may have an individual normal 220. The individual normal 220 may indicate the general direction of "up" (e.g., a direction perpendicular to a plane containing the point that is tangential to a surface of the object 135). In some embodiments, by generating a mesh representation 400 for which the individual normals 220 of the point cloud 200 extend in a direction away from the center of the mesh representation 400, the problem of an inverted, mesh generation such as that illustrated in FIGS. 8A and 8B may be avoided. In some embodiments, the individual normal 220 may be represented as a directional vector. In block 2030, each of the individual normal values 220 for each of the points of the point cloud 200 is summed together to determine a point cloud normal 230. That is to say that the contribution of the directional parameters of each individual normal 220 for each point of the point cloud 200 is calculated to derive the point cloud normal 230. Those of skill in the art will recognize that there are multiple methods for the calculation of a sum of vectors (e.g., the individual normals 220 for the points of the point cloud 200) that may be employed without deviating from the present inventive concepts.

FIG. 11A illustrates an example in which the individual normals 220 of the points of a point cloud 200 may be analyzed to calculate a point cloud normal 230, according to embodiments described herein. In some embodiments, the point cloud normal 230 indicates a weighted average of the individual normals 220 of the points of a point cloud 200. The calculated point cloud normal 230 provides a general reference of "up" for the point cloud 200. Stated another way, the point cloud normal 230 is a weighted reference that indicates a direction that is perpendicular to an approximate best-fit plane through the point cloud 200.

Figure 11B:
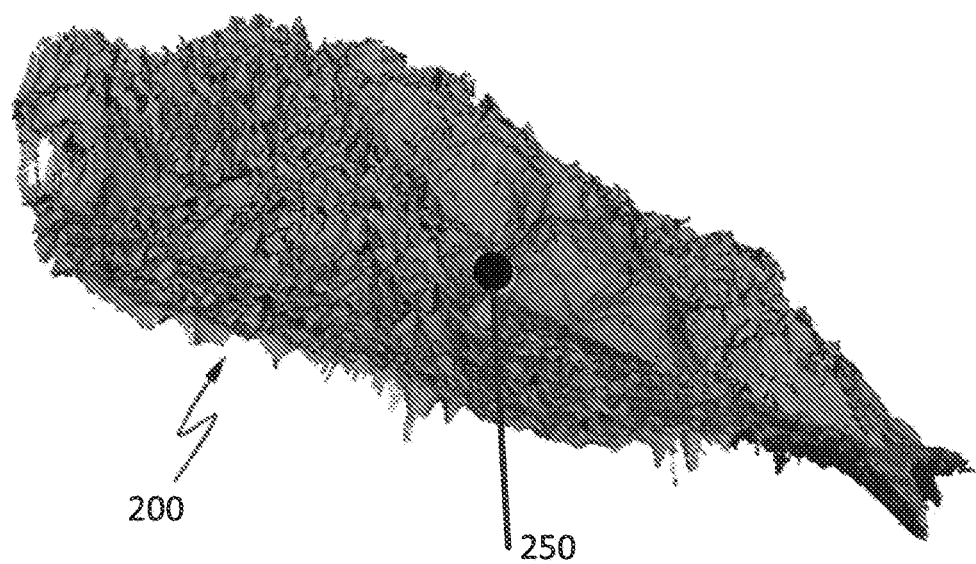
FIG. 11B illustrates an example in which the center of gravity of the points of a point cloud may be calculated, according to various embodiments described herein.

Referring again to FIG. 9, once the point cloud normal 230 has been calculated in block 2030, the operations 2000 may continue with block 2040. In block 2040, a center of gravity 250 for the point cloud 200 may be calculated. FIG. 11B illustrates an example in which the center of gravity 250 of the points of a point cloud 200 may be calculated, according to various embodiments described herein.

The center of gravity 250 of the point cloud 200 may be based on the coordinates of each of the individual points of the point cloud 200. For example, in some embodiments, the center of gravity 250 of the point cloud 200 may be calculated by summing the coordinates in the x, y, and z directions for each of the points of the point cloud 200, and then dividing the values by the number of points in the point cloud 200. For example, for a point cloud 200 of n points, from p1 to pn, each having an x-coordinate $x_p$, a y-coordinate $y_p$, and a z-coordinate $z_p$ in a 3D space, the (x,y,z) coordinate of the center of gravity 250 may be given by:

$$x = \frac{\sum_{k=0}^{n} x_{pk}}{n}$$

$$y = \frac{\sum_{k=0}^{n} y_{pk}}{n}$$

$$z = \frac{\sum_{k=0}^{n} z_{pk}}{n}$$

Though the above equations represent an averaging of the coordinates, it will be understood that other methods for calculating the center of gravity 250. For example, in some embodiments, the median value for the coordinates of the points of the point cloud 200 may be used rather than the mean. In some embodiments, the coordinates of the points of the point cloud 200 may be statistically analyzed to provide a weighted average coordinate set. Other mechanisms for calculating the center of gravity 250 of a set of points of a point cloud 200 may be used without deviating from the inventive concepts, as will be understood by one of ordinary skill in the art.

Figure 11C:
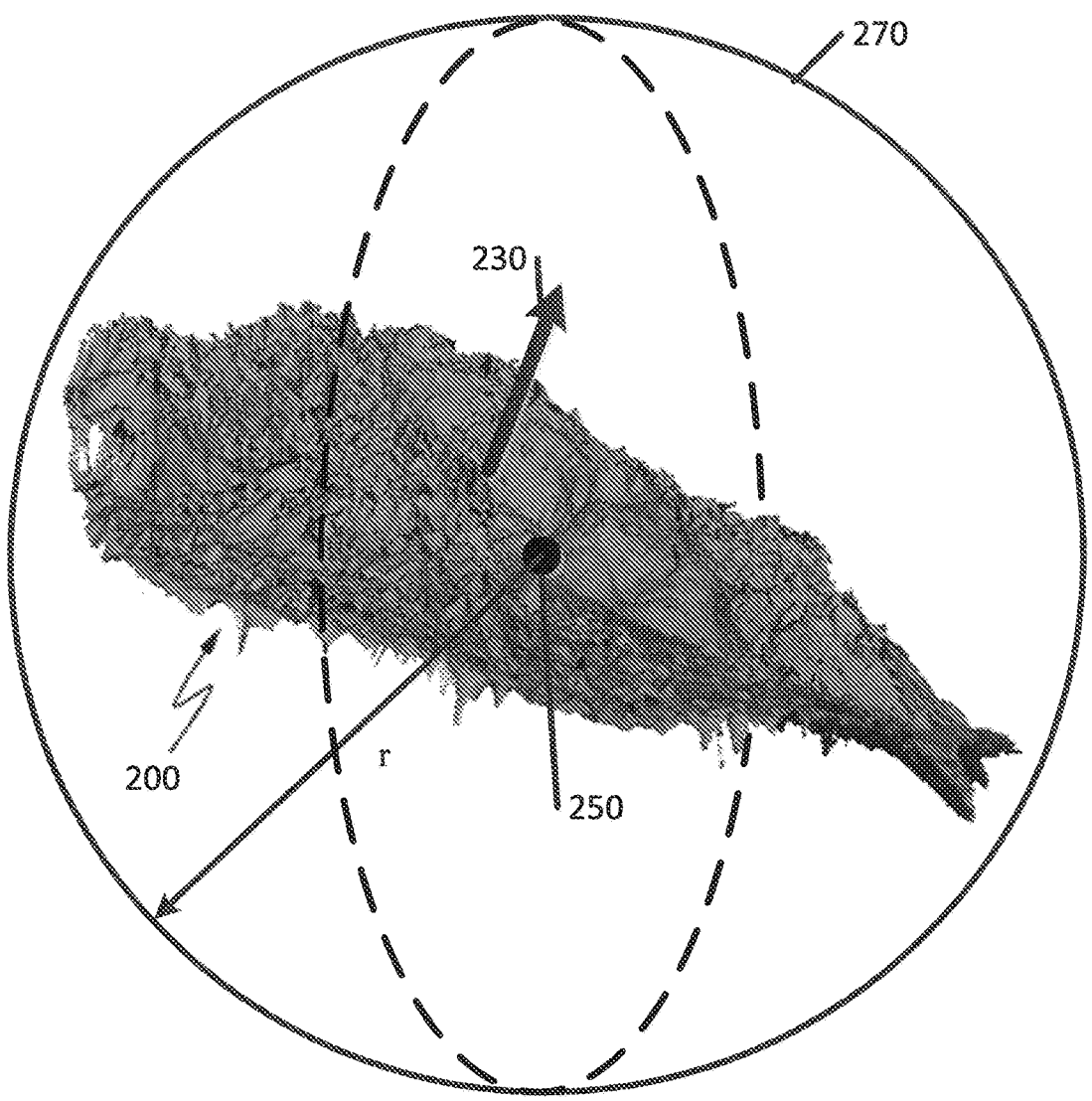
FIG. 11C illustrates the generation of a containing shape for the point cloud and center of gravity of FIG. 11B, according to various embodiments described herein.

Referring again to FIG. 9, after the center of gravity 250 for the point cloud 200 has been calculated in block 2040, the operations 2000 may continue with block 2050, in which a containing shape 270 is generated for the point cloud 200 based on the calculated center of gravity 250. FIG. 11C illustrates the generation of a containing shape 270 for the point cloud 200 and center of gravity 250 of FIG. 11B, according to various embodiments described herein. In some embodiments, the containing shape 270 may be a containing sphere 270. To generate a containing sphere 270, a radius r may be calculated for which a sphere with a center at the center of gravity 250 contains all of the points of the point cloud 200. In some embodiments, the calculated radius r may be a minimum radius for which all of the points of the point cloud 200 are contained with the sphere, but the present inventive concepts are not limited thereto. The containing sphere 270 may be a virtual sphere that contains all of the points of the point cloud 200 and has the calculated center of gravity 250 as the center of the containing sphere 270.

Though FIG. 11C illustrates a containing sphere 270, it will be understood that other 3D geometrical containing shapes 270 may be possible. For example, an ellipsoid, a polyhedron, or other complex geometrical 3D shape.

In addition, though FIG. 11C illustrates generating a containing shape 270 based on the calculated center of gravity 250, it will be understood that other options for creating the containing shape 270 are possible without deviating from the present inventive concepts. For example, another sphere fitting algorithm, such as the Ritter algorithm, may be used. The Ritter algorithm is described in "An Efficient Bounding Sphere," by Jack Ritter, published in Graphics Gems (April 2014). The use of the Ritter algorithm may assist with processing a point cloud 200 with a large number of points at one end of the point cloud 200. In such a scenario, the calculation of the center of gravity 250 of the point cloud 200 may be shifted towards the dense area of the point cloud 200, and the containing shape 270 may have a larger radius. The use of the Ritter algorithm may result in a containing shape 270 with a smaller radius for the same point cloud 200.

Figure 11D:
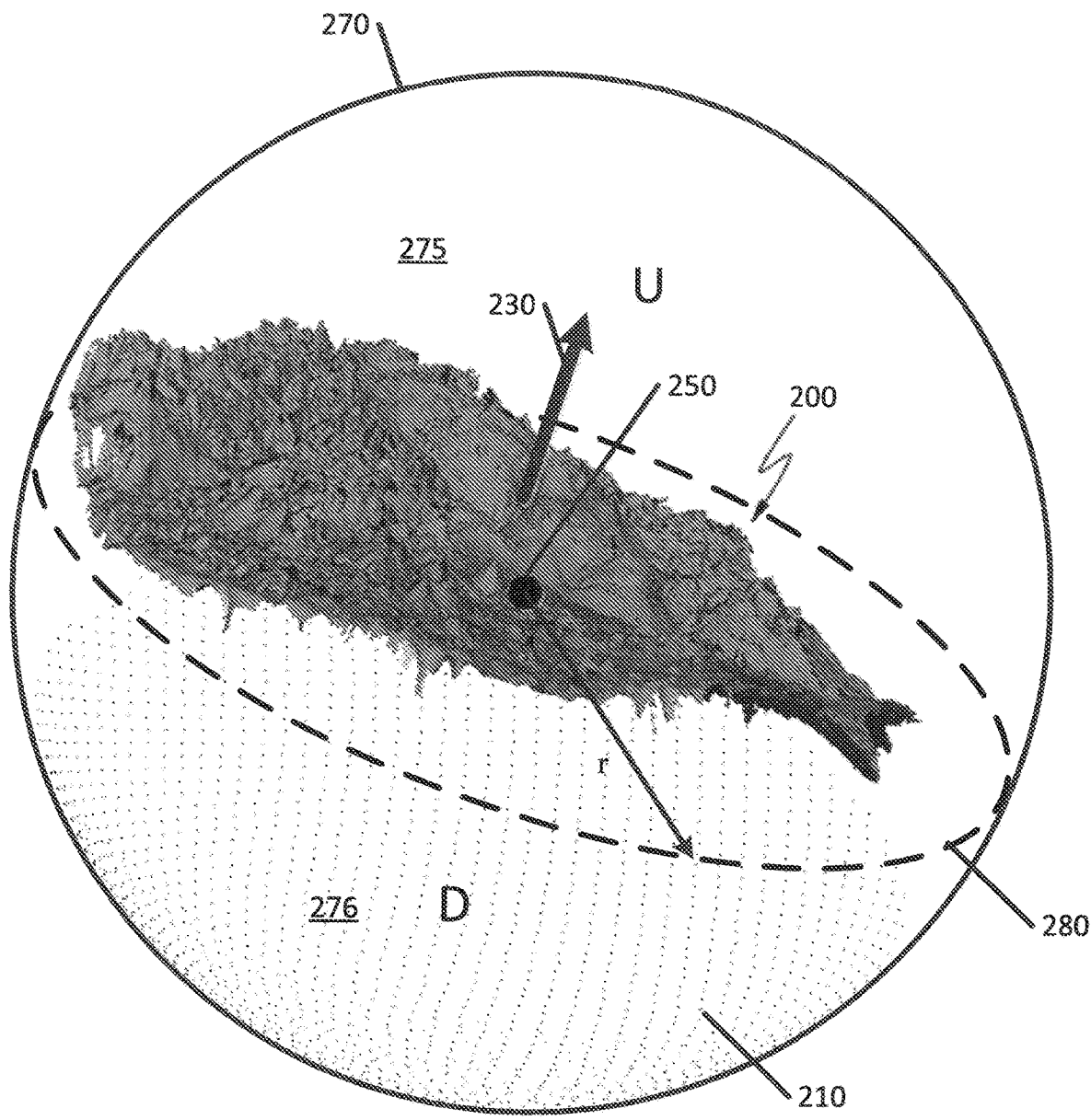
FIG. 11D illustrates the addition of new points into the point cloud along the surface of the containing shape of FIG. 11C.

Referring again to FIG. 9, after the containing sphere 270 has been calculated in block 2050, the operations 2000 may continue with block 2060, in which new points 210 are added to the point cloud 200 along a surface of the containing sphere 270 based on the calculated point cloud normal 230. FIG. 11D illustrates the addition of new points 210 into the point cloud 200 along the surface of the containing shape 270 of FIG. 11C. The new points 210 may be added to the point cloud 200 on coordinates that are calculated to be along the surface of the virtual containing sphere 270 that was generated in block 2050. The new points 210 may be added to a portion of the surface of the containing sphere 270 that is opposite the center of gravity 250 from the direction indicated by the point cloud normal 230.

As illustrated in FIG. 11D, an equator 280 may be established along the surface of the containing sphere 270. As used herein, the equator 280 refers to a virtual designation of a boundary along a surface of the containing sphere 270 at a midpoint of the containing sphere 270. The equator 280 may be a circle about the circumference of the containing sphere 270 that has the center of gravity 250 as its center and is contained in a plane that is perpendicular to the point cloud normal 230. Stated another way, using a standard globe as a reference, the equator 280 is a boundary that divides the containing sphere 270 into two hemispheres, for which the point cloud normal 230 indicates the "northern," or upper, hemisphere 275. In such a designation, the point cloud normal 230 may indicate "up," or areas "above" the designated equator 280 (illustrated as region "U" in FIG. 11D). Points "below" the equator 280 are those points that are in a "southern," or lower, hemisphere 276 (adjacent the plane containing the equator 280 in a direction opposite the point cloud normal 230 (illustrated as region "D" in FIG. 11D).

When new points 210 are added to the surface of the containing sphere 270 they may be added below the equator 280. That is to say the points may be added to the surface of the containing sphere 270 separated from the point cloud 200 in a direction opposite the point cloud normal 230.

In some embodiments, the new points 210 may be added randomly along the surface of the containing shape 270. In some embodiments, the new points 210 may be added uniformly across the surface of the containing shape 270.

Figure 12:
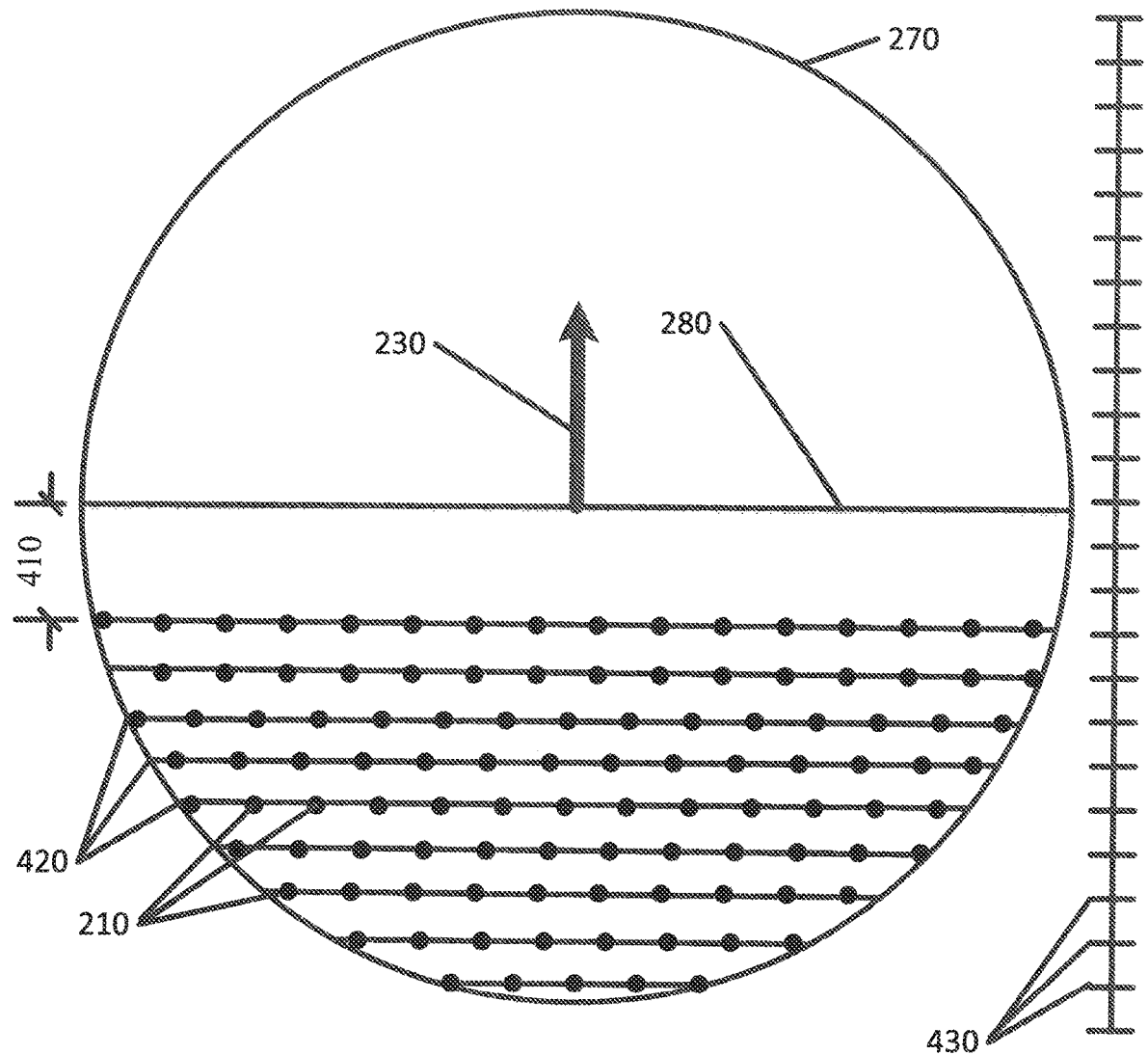
FIG. 12 illustrates an example of a two-dimensional representation of a containing sphere, in which areas to add new and/or additional points are determined based on the configuration of an equator of the containing sphere, according to various embodiments described herein.

FIG. 12 illustrates an example of a two-dimensional representation of a containing sphere 270, in which areas to add new and/or additional points 210 are determined based on the configuration of the equator 280 of the containing sphere 270, according to various embodiments described herein. As illustrated in FIG. 12, the new points 210 may be added along distribution lines 420 arranged across the surface of the containing sphere 270. It will be understood that the representation of FIG. 12 is intended to be a two-dimensional representation of the three-dimensional virtual containing sphere 270. FIG. 12 illustrates new points 210 placed along particular distribution lines 420. However, it will be understood that more new points 210 could be placed along more or fewer distribution lines 420 than those illustrated in FIG. 12.

As illustrated in FIG. 12, in some embodiments, a standoff region 410 may be established below the equator 280 in which no new points 210 are added to the surface of the containing sphere 270. The standoff region 410 may allow for compensation in situations for which the calculation of the point cloud normal 230 is not exactly correct. The addition of the new points 210 to the point cloud 200 may result in the surface reconstruction algorithm adjusting the surface of the mesh representation 400 to account for the new points 210. In situations where the point cloud 200 contains anomalies and/or outlier points, the point cloud normal 230 may be skewed based on the anomalies. By providing a standoff region 410 in which no new points 210 are added, the model accommodates potential deviations in the calculation of the point cloud normal 230. This minimizes and/or reduces the chances for overshoot in the calculation of the surface reconstruction based on the new points 210 added to the point cloud 200. In some embodiments, the standoff region 410 may be calculated as twenty degrees below the equator 280, but the present inventive concepts are not limited thereto. In some embodiments, the standoff region 410 may be based on a percentage of the surface area of the containing sphere 270 beneath the equator 280 (e.g., 30% of the surface area below the equator 280).

In some embodiments the standoff region 410 may be dynamically calculated based on the conditions of the scan. For example, when the point cloud 200 contains a large number of points, the standoff region 410 may be smaller (e.g., 10 degrees), and when the point cloud 200 contains a smaller number of points, the standoff region 410 may be larger (e.g., 30 degrees). The variation in the size of the standoff region 410 may be based on a recognition that fewer points may mean less certainty with respect to calculation of the point cloud normal 230. Similarly, in some embodiments, the standoff region 410 may be smaller when a calculated average deviation between respective ones of the individual normals 220 (see FIG. 11A) of the points of the point cloud 200 is small, and the standoff region 410 may be larger when the calculated average deviation between respective ones of the individual normals 220 of the points of the point cloud 200 is large.

Figure 13:
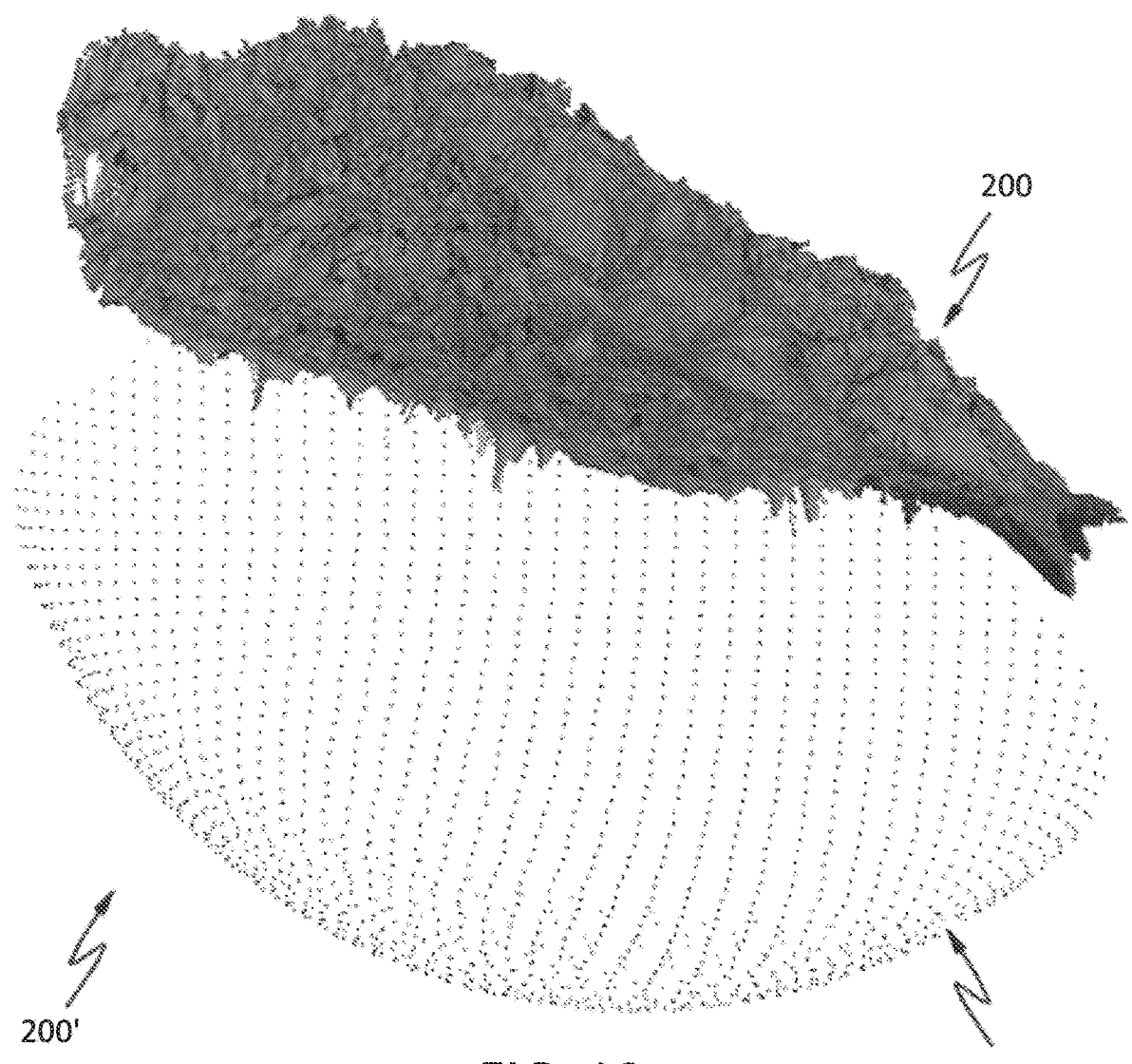
FIG. 13 illustrates the point cloud of FIG. 7A with new points added, to generate a new point cloud.

As illustrated in FIG. 12, the distribution lines 420 may be arranged uniformly on the surface of the containing sphere 270, though the present inventive concepts are not limited thereto. In some embodiments, the distribution lines 420 may be placed along latitudes 430 (e.g., circles on the surface of the containing sphere 270 that are arranged in parallel with the equator 280) uniformly along the diameter of the containing sphere 270. In some embodiments, the latitudes 430 may be arranged such that one hundred latitudes 430 are distributed uniformly in parallel with the equator 280 along the diameter of the containing sphere 270. When new points 210 are added in block 2060, the new points 210 may be added to the point cloud 200 along distribution lines 420 that are on the surface of the containing sphere 270 at latitudes 430 below the equator 280 (e.g., in a portion of the containing sphere 270 that is opposite a plane containing the equator 280 in a direction opposite the point cloud normal 230) and not within the standoff region 410. In some embodiments, the new points 210 may be uniformly distributed along respective ones of the latitudes 430. In some embodiments, one hundred new points 210 may be added for each latitude 430, though the present inventive concepts are not limited thereto. In some embodiments, more than one hundred new points 210 or fewer than one hundred new points 210 may be added per latitude 430. In some embodiments, some latitudes 430 may not be populated with new points 210. For example, in some embodiments, every other latitude 430 may be populated with new points, though one of ordinary skill in the art will recognize that additional mechanisms to distribute new points are possible without deviating from the present inventive concepts. FIG. 13 illustrates the point cloud 200 of FIG. 7A, with new points 210 added according to various embodiments described herein, to generate a new point cloud 200'.

Figure 14:
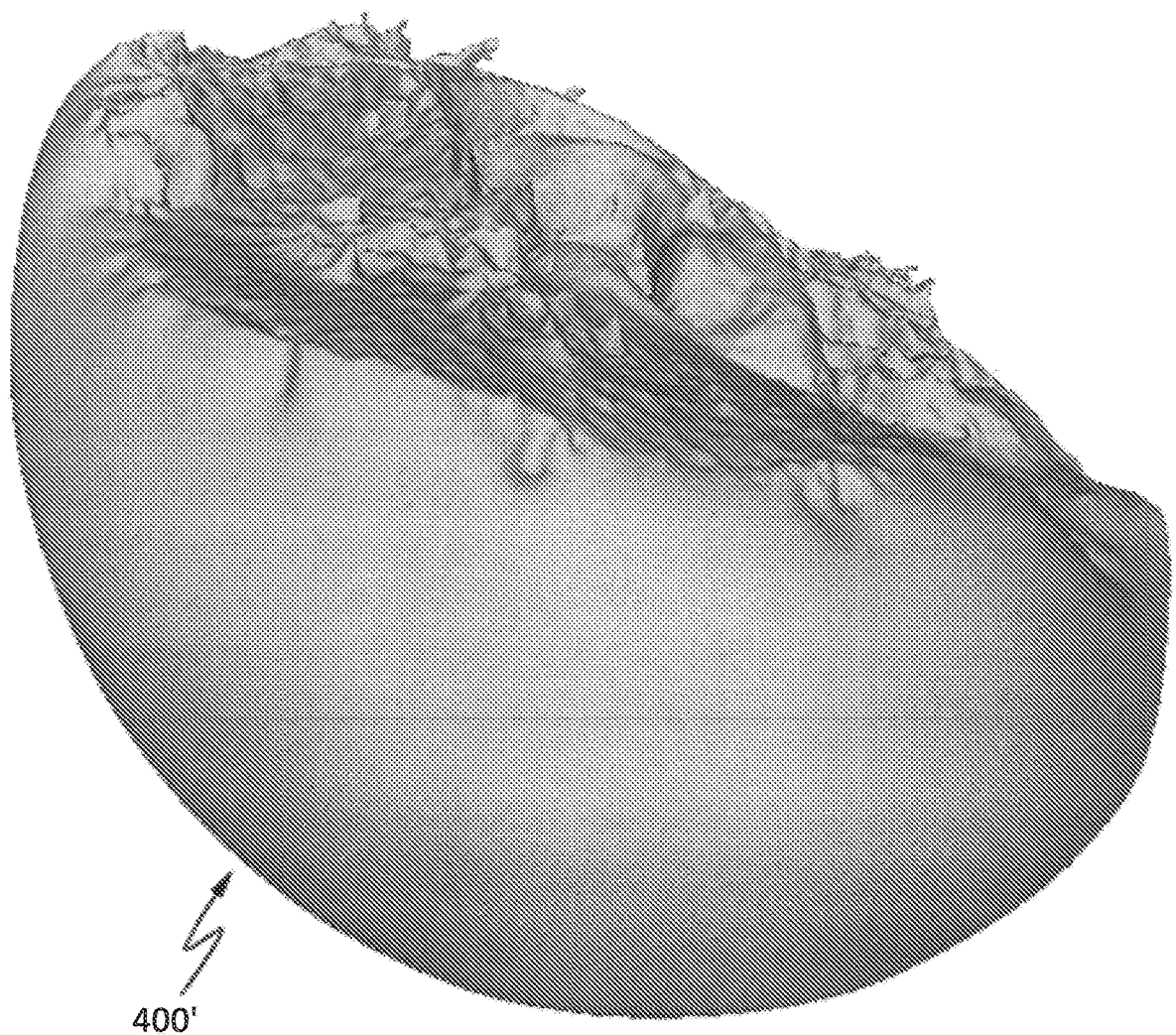
FIG. 14 illustrates an example in which a surface reconstruction algorithm is run against the new point cloud to generate an improved mesh representation of the object, according to various embodiments described herein.

Referring again to FIG. 9, after the new points 210 are added to the point cloud 200 to generate the new point cloud 200' in block 2060, the operations 2000 may continue with block 2070, in which the surface reconstruction algorithm is run on the new point cloud 200'. As discussed herein, the surface reconstruction algorithm may, in some embodiments, be a Poisson surface reconstruction. FIG. 14 illustrates an example in which a surface reconstruction algorithm is run against the new point cloud 200' to generate an improved mesh representation 400' of the object 135, according to various embodiments described herein. As illustrated in FIG. 14, because the new point cloud 200' contained new points 210 which were located based on a calculated point cloud normal 230 and center of gravity 250 of the scanned point cloud 200, the surface reconstruction may be weighted to add additional mesh portions below the scanned image. The improved mesh representation 400' thus differs from the mesh representation 400c of FIG. 7B in that the improved mesh representation 400' is watertight. Moreover, the improved mesh representation 400' thus differs from the mesh representation 400d of FIGS. 8A and 8B in that the improved mesh representation 400' maintains the points of interest related to the scanned object 135 on the outside of the improved mesh representation 400'. The improved mesh representation 400' of the present inventive concepts avoids the outcome of a surface reconstruction in which the mesh representation (e.g., mesh representation 400d of FIGS. 8A and 8B) is turned "inside out." In some embodiments, the improved mesh representation 400' is configured such that the individual normals 220 of the point cloud 200 (see FIG. 11A) extend in a direction away from a center of the improved mesh representation 400' (e.g., the individual normals 220 point "outward" from the improved mesh representation 400').

By avoiding the generation of mesh representation which does not adequately represent the object 135 being scanned, the present inventive concepts save time and resources. Performing the surface reconstruction can be a lengthy process, and the methods and devices of the present inventive concepts provided herein avoid wasted resources associated with failed mesh representations. Moreover, because the improved mesh representation 400' is systematically weighted to the maintain the correct orientation of the point cloud 200, the quality of the generated improved mesh representation 400' may be superior to that of a mesh representation generated in which the orientation of the point cloud 200 is not taken into account. The distribution of the new points 210 allows finer control of where new mesh is to be generated when new mesh is added during surface reconstruction to make the improved mesh representation 400' watertight. This additional control allows for more deterministic results and a higher quality in the overall improved mesh representation 400'.

Once the improved mesh representation 400' has been generated, the operations 2000 (see FIG. 9) may be complete. Referring again to FIG. 4A, the operations 1000 to improve the initial mesh representation 400 may conclude with texturing 1040 the improved mesh representation 400'. Texturing 1040 may include associating features and/or characteristics of the scanned object 135 with the surface of the improved mesh representation 400'. In some embodiments, texturing 1040 may include saving the color data (e.g., RGB data) determined from the keyframe images 130 to determine how to color respective polygons 300 (see FIG. 3) in the mesh representation 400'. For example, texture such as hair may be associated with particular surfaces of the improved mesh representation 400' where appropriate. Other characteristics of the scanned object 135 may be associated with the improved mesh representation 400', such as skin, hair, and/or eye color, and the like.

In some embodiments additional analysis may be performed on the improved mesh representation 400'. For example, since the improved mesh representation 400' is watertight, additional processing may be performed to minimize the portions of the improved mesh representation 400' that were added to augment the surface reconstruction, while still maintaining the watertight characterization of the improved mesh representation 400'. Methods to adjust the improved mesh representation 400' are discussed in co-pending PCT Application No. PCT/US2017/049550 entitled "Methods, Devices and Computer Program Products for Generation of Mesh in Constructed 3D Images Containing Incomplete Information."

Once the operations 1000 are complete, the improved mesh representation 400' may be used in multiple ways. For example, the improved mesh representation 400' may be used within virtual environments as a representation of the 3D object 135. In some embodiments, the improved mesh representation 400' may be used to manufacture a replica of the object 135, such as through the use of a 3D printer. The manufacture of physical objects from 3D representations such as the improved mesh representation 400' will be understood by those of skill in the art.

Figure 4B:
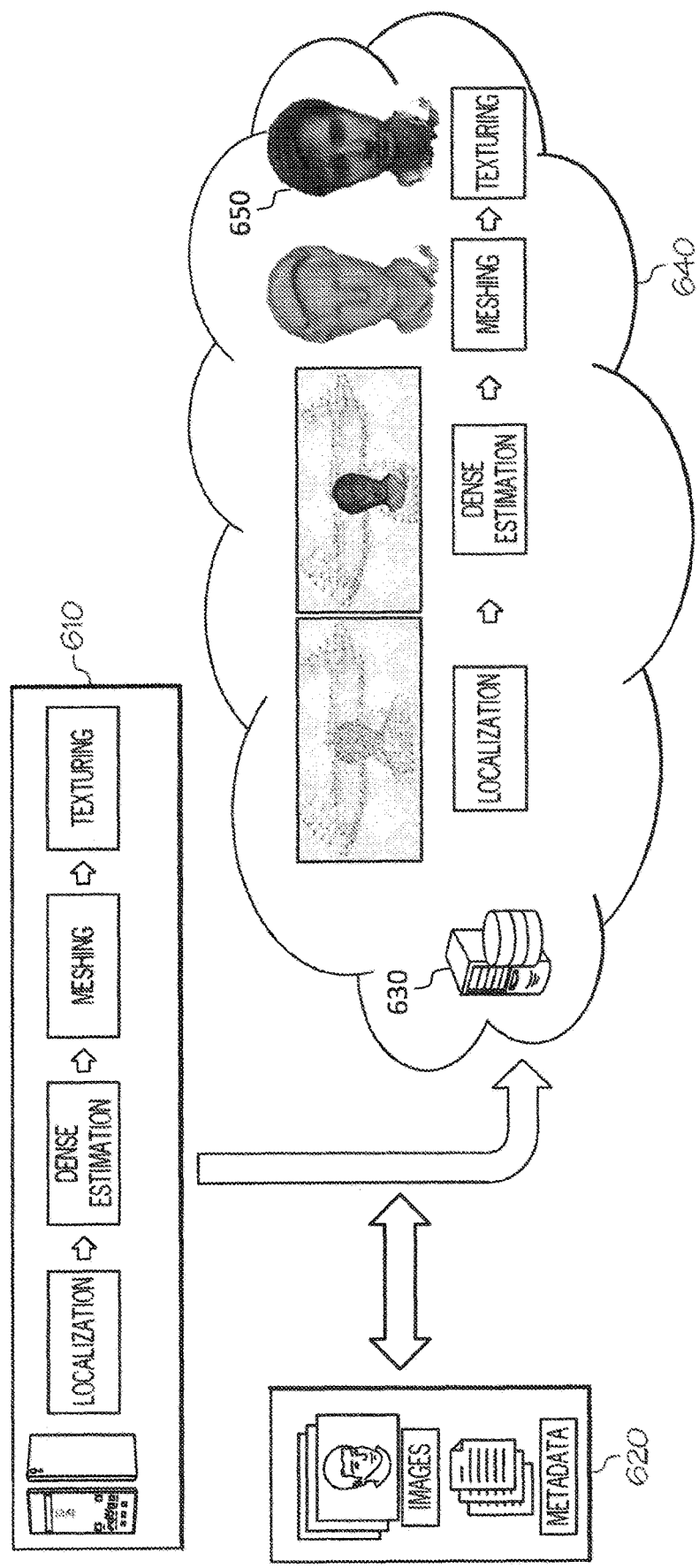
FIG. 4B is a flow chart illustrating operations of methods to iteratively improve 3D models according to various embodiments described herein.

FIG. 4B is a flow chart illustrating operations of methods to iteratively improve 3D models according to various embodiments described herein. Referring to FIG. 4B, a live scan 610 may be performed of an object 135 using a camera 100 to produce a first 3D model of the object 135. A user of the camera 100 (or a device containing the camera 100) may select an option to perform post-processing operations 640 at a 3D modeling system 630 to generate a second 3D model 650 of the object 110. The second 3D model 650 may have improved qualities as compared to the first 3D model of the live scan 610. For example, the post-processing operations 640 may reduce errors that may be present in the first 3D model.

The camera 100 (or a device containing the camera 100) may transmit data 620 to the 3D modeling system 630 for use in performing the post-processing operations 640. For example, the camera 100 (or a device containing the camera 100) may transmit the keyframe images 130, the mesh representation 400 (not shown) and/or metadata 405 (see FIG. 4A). The metadata 405 may include one more of the pose information corresponding to the position and orientation of the camera 100 with respect to the object 135 for the keyframe images 130.

In some embodiments, the 3D modeling system 630 may be remote from the camera 100 (or a device containing the camera 100). For example, the 3D modeling system 630 may be a server that provides a cloud computing service and is connected to the camera 100 (or a device containing the camera 100) via a network. Embodiments may be described with respect to a remote 3D modeling system 630, however it will be understood that in some embodiments the post-processing operations 640 may be performed on the camera 100 (or a device containing the camera 100) and it may not be necessary to transmit the keyframe images 130 or the metadata 405.

In some embodiments, the keyframe images 130 may be identified from the 2D images captured by the camera 100. Keyframe images 130 may be selected using a variety of techniques, such as those based on pose change, angular change, and/or based on matches between frames. Matches between frames may be quantified by a ratio of matching pixels between two images. A smaller ratio of matching pixels may indicate a greater change in the content of the two images, thus identifying the two images as keyframe images 130. Two images that have a significant number of matching pixels may be determined to be a match, and removed from consideration as a keyframe image 130. In other words, when there are not many matches between two images, a keyframe image 130 may be identified.

As described herein, the operations 1000 illustrated in FIG. 4A may correspond to the operations of the live scan 610 performed on the camera 100 (or a device containing the camera 100) and/or the post-processing operations 640 performed at a 3D modeling system 630. In other words, the operations described herein for iteratively improving a 3D mesh representation may be performed during the live scan 610 performed on the camera 100 (or a device containing the camera 100) and/or the post-processing operations 640 performed at a 3D modeling system 630.

Figure 15:
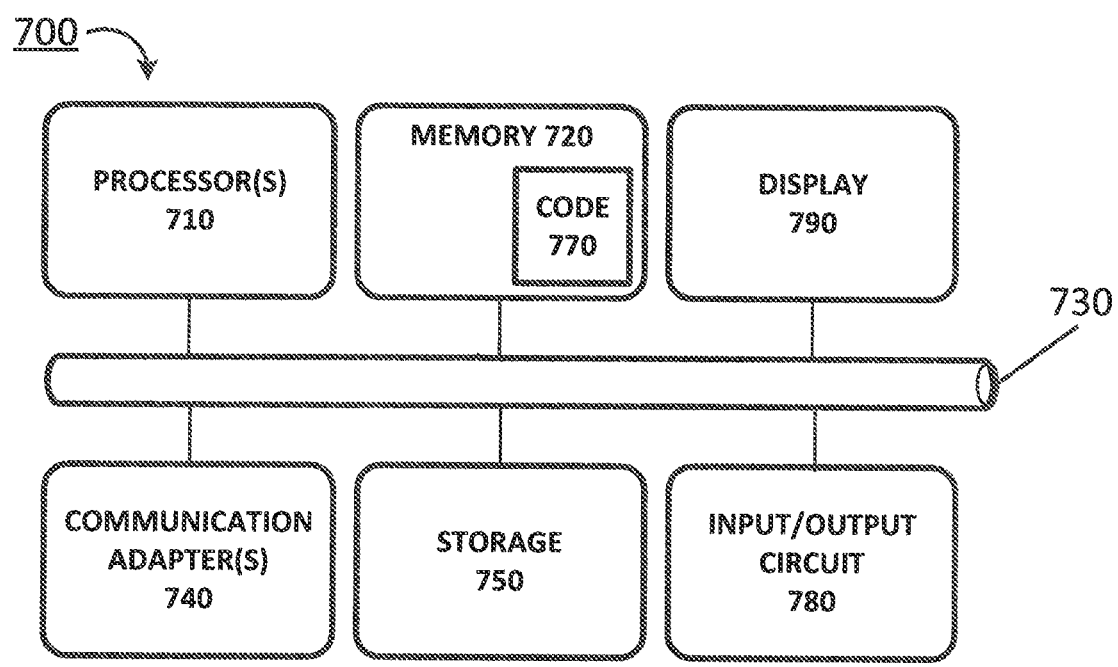
FIG. 15 is a block diagram of an electronic device capable of implementing the inventive concepts, according to various embodiments described herein.

FIG. 15 is a block diagram of an electronic device 700 capable of implementing the inventive concepts, according to various embodiments described herein. The electronic device 700 may use hardware, software implemented with hardware, firmware, tangible computer-readable storage media having instructions stored thereon and/or a combination thereof, and may be implemented in one or more computer systems or other processing systems. The electronic device 700 may also utilize a virtual instance of a computer. As such, the devices and methods described herein may be embodied in any combination of hardware and software. In some embodiments, the electronic device 700 may be part of an imaging system containing the camera 100. In some embodiments, the electronic device 700 may be in communication with the camera 100 (or a device containing the camera 100) illustrated in FIG. 1, such as the 3D modeling system 630 in FIG. 4B.

As shown in FIG. 15, the electronic device 700 may include one or more processors 710 and memory 720 coupled to an interconnect 730. The interconnect 730 may be an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), TIC (I2C) bus, or an Institute of Electrical and Electronics Engineers (IEEE) standard 1394 bus, also called "Firewire."

The processor(s) 710 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor(s) 710 may be configured to execute computer program instructions from the memory 720 to perform some or all of the operations for one or more of the embodiments disclosed herein.

The electronic device 700 may also include one or more communication adapters 740 that may communicate with other communication devices and/or one or more networks, including any conventional, public and/or private, real and/or virtual, wired and/or wireless network, including the Internet. The communication adapters 740 may include a communication interface and may be used to transfer information in the form of signals between the electronic device 700 and another computer system or a network (e.g., the Internet). The communication adapters 740 may include a modem, a network interface (such as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art. In some embodiments, the communication adapters 740 may be used to transmit and/or receive data associated with the embodiments for creating the mesh representation described herein. In some embodiments, the electronic device 700 may be in communication with the camera 100 (or a device containing the camera 100) illustrated in FIG. 1 via the one or more communication adapters 740.

The electronic device 700 may further include memory 720 which may contain program code 770 configured to execute operations associated with the embodiments described herein. The memory 720 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 720 may also include systems and/or devices used for storage of the electronic device 700.

The electronic device 700 may also include one or more input device(s) such as, but not limited to, a mouse, keyboard, camera (e.g., camera 100 of FIG. 1), and/or a microphone connected to an input/output circuit 780. The input device(s) may be accessible to the one or more processors 710 via the system interconnect 730 and may be operated by the program code 770 resident in the memory 720

The electronic device 700 may also include a display 790 capable of generating a display image, graphical user interface, and/or visual alert. The display 790 may be accessible to the processor 710 via the system interconnect 730. The display 790 may provide graphical user interfaces for receiving input, displaying intermediate operations/data, and/or exporting output of the embodiments described herein.

The electronic device 700 may also include a storage repository 750. The storage repository 750 may be accessible to the processor(s) 710 via the system interconnect 730 and may additionally store information associated with the electronic device 700. For example, in some embodiments, the storage repository 750 may contain mesh representations, object data and/or point cloud data as described herein. Though illustrated as separate elements, it will be understood that the storage repository 750 and the memory 720 may be collocated. That is to say that the memory 720 may be formed from part of the storage repository 750.

In the above-description of various embodiments, it is to be understood that the terminology used herein is for the purpose of describing particular embodiments only and is not intended to be limiting of the embodiments as described herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module," or variants thereof.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

What is claimed is:

1. A method of creating a three-dimensional representation of an object, the method comprising:
    adding a distribution of additional points to a plurality of points representative of captured portions of the object based on a computational analysis of the plurality of points; and
    performing a surface reconstruction on the plurality of points and the distribution of additional points to generate a three-dimensional mesh representation of the object that is watertight,
    wherein adding the distribution of additional points to the plurality of points is performed responsive to an analysis of a plurality of keyframe images of the object that were used to generate the plurality of points, and
    wherein the analysis of the plurality of keyframe images comprises determining an angular range of orientations of the keyframe images with respect to the object.

2. The method of claim 1, wherein adding the distribution of additional points to the plurality of points comprises adding the distribution of additional points to cause the surface reconstruction on the plurality of points to generate the three-dimensional mesh representation such that individual normal values of respective ones of the plurality of points extend in a direction away from a center of the three-dimensional mesh representation.

3. A computer program product for operating an imaging system, the computer program product comprising a non-transitory computer readable storage medium having computer readable program code embodied in the non-transitory computer readable storage medium that when executed by a processor causes the processor to perform the method of claim 1.

4. A method of creating a three-dimensional representation of an object, the method comprising:
    adding a distribution of additional points to a plurality of points representative of captured portions of the object based on a computational analysis of the plurality of points; and performing a surface reconstruction on the plurality of points and the distribution of additional points to generate a three-dimensional mesh representation of the object that is watertight, wherein adding the distribution of additional points to the plurality of points based on the computational analysis of the plurality of points comprises:

determining a point cloud normal for the plurality of points;

determining a center of gravity for the plurality of points;

generating a containing shape for the plurality of points based on the center of gravity; and adding the distribution of additional points on a surface of the containing shape relative to the point cloud normal.

5. The method of claim 4, wherein determining the point cloud normal for the plurality of points comprises summing respective normal values for each point of the plurality of points.

6. The method of claim 4, wherein determining the center of gravity for the plurality of points, comprises summing coordinates in x, y, and z directions for each point of the plurality of points and then dividing the sum by a number of points in the plurality of points.

7. The method of claim 4, wherein generating the containing shape for the plurality of points based on the center of gravity comprises generating a virtual sphere centered at the center of gravity and having a radius of sufficient length to contain the plurality of points.

8. The method of claim 4, wherein the containing shape is a containing sphere, and wherein adding the distribution of additional points on the surface of the containing sphere comprises:

establishing an equator for the containing sphere to divide the containing sphere into two hemispheres; and adding the distribution of additional points to a first hemisphere of the two hemispheres.

9. The method of claim 8, wherein the first hemisphere is adjacent the equator in a direction opposite the point cloud normal.

10. The method of claim 8, wherein the equator is placed on a plane that contains the center of gravity and extends in a direction that is perpendicular to the point cloud normal.

11. The method of claim 8, wherein adding the distribution of additional points to the first hemisphere comprises:

establishing a standoff region within the first hemisphere; and adding the distribution of additional points uniformly in areas of the first hemisphere that exclude the standoff region.

12. The method of claim 8, wherein adding the distribution of additional points to the first hemisphere comprises:

designating uniform latitudes within the first hemisphere that are parallel to the equator; and adding the distribution of additional points uniformly along at least one of the uniform latitudes.

13. An imaging system for processing images, the imaging system comprising:

a processor; and a memory coupled to the processor and storing computer readable program code that when executed by the processor causes the processor to perform operations comprising:

adding a distribution of additional points to a plurality of points representative of captured portions of an object based on a computational analysis of the plurality of points; and performing a surface reconstruction on the plurality of points and the distribution of additional points to generate a three-dimensional mesh representation of the object that is watertight, wherein adding the distribution of additional points to the plurality of points based on the computational analysis of the plurality of points comprises:

determining a point cloud normal for the plurality of points;

determining a center of gravity for the plurality of points;

generating a containing shape for the plurality of points based on the center of gravity; and adding the distribution of additional points on a surface of the containing shape relative to the point cloud normal.

14. The imaging system of claim 13, wherein determining the point cloud normal for the plurality of points comprises summing respective normal values for each point of the plurality of points.

15. The imaging system of claim 13, wherein generating the containing shape for the plurality of points based on the center of gravity comprises generating a virtual sphere centered at the center of gravity and having a radius of sufficient length to contain the plurality of points.

16. The imaging system of claim 13, wherein the containing shape is a containing sphere, and wherein adding the distribution of additional points on the surface of the containing sphere comprises:

establishing an equator for the containing sphere to divide the containing sphere into two hemispheres; and adding the distribution of additional points to a first hemisphere of the two hemispheres.

17. The imaging system of claim 16, wherein adding the distribution of additional points to the first hemisphere comprises:

establishing a standoff region within the first hemisphere; and adding the distribution of additional points uniformly in areas of the first hemisphere that exclude the standoff region.

18. The imaging system of claim 16, wherein adding the distribution of additional points to the first hemisphere comprises:

designating uniform latitudes within the first hemisphere that are parallel to the equator; and adding the distribution of additional points uniformly along at least one of the uniform latitudes.

* * * * *